US009569692B2

(12) United States Patent
Xie et al.

(10) Patent No.: US 9,569,692 B2
(45) Date of Patent: Feb. 14, 2017

(54) CONTEXT-BASED IMAGE RECOGNITION FOR CONSUMER MARKET RESEARCH

(71) Applicant: The Nielsen Company (US), LLC, Schaumburg, IL (US)

(72) Inventors: Wei Xie, Woodridge, IL (US); Michael Allen Bivins, San Francisco, CA (US); Steve Jones, Oxford (GB); Kevin Keqiang Deng, Safety Harbor, FL (US); Brian Schiller, St. Louis, MO (US); Jonathan Sullivan, Natick, MA (US); Alejandro Terrazas, Santa Cruz, CA (US); Michael Sheppard, Brooklyn, NY (US)

(73) Assignee: The Nielsen Company (US), LLC, New York, NY (US)

( * ) Notice: Subject to any disclaimer, the term of this patent is extended or adjusted under 35 U.S.C. 154(b) by 83 days.

(21) Appl. No.: 14/530,129

(22) Filed: Oct. 31, 2014

(65) Prior Publication Data

US 2016/0125265 A1   May 5, 2016

(51) Int. Cl.
  *G06T 7/00*   (2006.01)
  *G06K 9/64*   (2006.01)
  (Continued)

(52) U.S. Cl.
  CPC ......... *G06K 9/6202* (2013.01); *G06K 9/00691* (2013.01); *G06Q 30/0201* (2013.01);
  (Continued)

(58) Field of Classification Search
  None
  See application file for complete search history.

(56) References Cited

U.S. PATENT DOCUMENTS 5,497,314 A * 3/1996 Novak ............ A47F 9/046
                                                235/383
5,673,334 A * 9/1997 Nichani ............ G06K 9/6857
                                                348/95

(Continued)

OTHER PUBLICATIONS

Angela Moscaritolo, "Amazon Adds 'Flow' Image Recognition to iOS App," retrieved on May 1, 2014, from http://www.pcmag.com/article2/0,2817,2430502,00.asp, Feb. 7, 2014 (1 page).

(Continued)

*Primary Examiner* — Chan Park
*Assistant Examiner* — Mia M Thomas
(74) *Attorney, Agent, or Firm* — Hanley, Flight & Zimmerman, LLC

(57) ABSTRACT

Example methods, apparatus, systems to perform context-based image recognition for consumer market research are disclosed. Disclosed example methods include comparing a first subset of feature points in a first region of interest of a reference image with a first subset of feature points of a first image residing within a first region corresponding spatially to the first region of interest and located at a first location in the first image to determine a first match value. Disclosed example methods also include, in response to determining the first match value satisfies a first threshold, comparing a second subset of feature points in a second region of interest of the reference image with a second subset of the feature points of the first image residing within a second region of the first image corresponding spatially to the second region of interest to determine a second match value.

24 Claims, 12 Drawing Sheets

(51) Int. Cl.
*G06K 9/62* (2006.01)
*G06K 9/00* (2006.01)
*G06Q 30/02* (2012.01)

(52) U.S. Cl.
CPC .... *G06T 7/0044* (2013.01); *G06K 2009/6213* (2013.01); *G06K 2209/25* (2013.01); *G06K 2209/27* (2013.01); *G06T 2207/10004* (2013.01)

(56) References Cited

U.S. PATENT DOCUMENTS

| | | | | |
|---|---|---|---|---|
| 6,026,377 | A * | 2/2000 | Burke | G06Q 10/087 235/383 |
| 6,310,964 | B1 * | 10/2001 | Mohan | G01B 11/024 348/89 |
| 6,327,388 | B1 * | 12/2001 | Zhou | G06F 17/30259 382/203 |
| 6,711,293 | B1 * | 3/2004 | Lowe | G06K 9/4671 382/219 |
| 6,944,324 | B2 * | 9/2005 | Tran | G06T 7/0004 382/101 |
| 6,975,434 | B1 * | 12/2005 | Pilu | H04N 1/0402 358/450 |
| 7,121,469 | B2 * | 10/2006 | Dorai | G06K 7/14 235/462.01 |
| 7,194,752 | B1 * | 3/2007 | Kenyon | G10L 25/48 382/118 |
| 7,422,147 | B2 | 9/2008 | Rosenbaum | |
| 7,543,745 | B1 | 6/2009 | Simske et al. | |
| 7,769,221 | B1 | 8/2010 | Shakes et al. | |
| 7,778,464 | B2 * | 8/2010 | Lee | G06F 17/30675 382/185 |
| 8,009,864 | B2 | 8/2011 | Linaker et al. | |
| 8,019,162 | B2 | 9/2011 | Zhang et al. | |
| 8,335,402 | B1 | 12/2012 | Manmatha et al. | |
| 8,368,918 | B2 | 2/2013 | Deng et al. | |
| 8,406,507 | B2 | 3/2013 | Ruzon et al. | |
| 8,526,705 | B2 | 9/2013 | Lancaster et al. | |
| 8,644,610 | B1 | 2/2014 | Ramkumar et al. | |
| 8,699,828 | B2 | 4/2014 | Ruzon et al. | |
| 8,958,651 | B2 * | 2/2015 | Ding | G06K 9/6211 382/154 |
| 9,152,862 | B2 * | 10/2015 | Ross | G06K 9/00577 |
| 2004/0076324 | A1 * | 4/2004 | Burl | G05D 1/0246 382/153 |
| 2004/0179585 | A1 * | 9/2004 | Yang | H04B 1/70751 375/148 |
| 2005/0084154 | A1 * | 4/2005 | Li | G06K 9/4652 382/190 |
| 2005/0213818 | A1 * | 9/2005 | Suzuki | G06K 9/4609 382/190 |
| 2005/0285947 | A1 * | 12/2005 | Grindstaff | G06T 7/202 348/208.4 |
| 2006/0161984 | A1 * | 7/2006 | Phillips | G06F 21/564 726/24 |
| 2008/0013836 | A1 * | 1/2008 | Nakamura | G06K 9/4642 382/209 |
| 2008/0095448 | A1 * | 4/2008 | Ono | G06K 9/6857 382/209 |
| 2008/0226129 | A1 * | 9/2008 | Kundu | A47F 9/045 382/103 |
| 2008/0273594 | A1 * | 11/2008 | Sedeffow | H04N 7/17318 375/240.01 |
| 2008/0298642 | A1 * | 12/2008 | Meenen | G06K 9/00 382/115 |
| 2008/0317383 | A1 * | 12/2008 | Franz | G06K 9/32 382/294 |
| 2009/0123892 | A1 * | 5/2009 | Sogo | A61C 11/00 433/213 |
| 2009/0192921 | A1 | 7/2009 | Hicks | |
| 2009/0287620 | A1 * | 11/2009 | Xu | G06K 9/00248 706/12 |
| 2010/0008598 | A1 * | 1/2010 | Riley | G06K 9/0063 382/299 |
| 2010/0027895 | A1 * | 2/2010 | Noguchi | G06K 9/4671 382/224 |
| 2010/0189309 | A1 * | 7/2010 | Rouzes | G01S 5/163 382/107 |
| 2010/0211602 | A1 * | 8/2010 | Menon | G06T 1/00 707/772 |
| 2010/0306080 | A1 * | 12/2010 | Trandal | G06Q 10/10 705/26.8 |
| 2011/0035402 | A1 * | 2/2011 | Agrawal | G06F 17/30864 707/769 |
| 2011/0254859 | A1 * | 10/2011 | Matsuda | G06F 3/011 345/633 |
| 2012/0095825 | A1 * | 4/2012 | Mei | G06Q 30/0244 705/14.43 |
| 2012/0229425 | A1 * | 9/2012 | Barrus | G06F 3/04883 345/179 |
| 2012/0299961 | A1 * | 11/2012 | Ramkumar | G06F 17/30047 345/632 |
| 2012/0327252 | A1 * | 12/2012 | Nichols | H04N 5/772 348/207.1 |
| 2013/0051667 | A1 * | 2/2013 | Deng | G06K 9/00691 382/168 |
| 2013/0127704 | A1 * | 5/2013 | Jung | G06F 3/017 345/156 |
| 2013/0127705 | A1 * | 5/2013 | Jung | G06F 3/0304 345/156 |
| 2013/0159127 | A1 * | 6/2013 | Myslinski | G06Q 30/00 705/26.1 |
| 2013/0163888 | A1 * | 6/2013 | Montalvo | G06K 9/627 382/225 |
| 2013/0198196 | A1 * | 8/2013 | Myslinski | G06F 17/30023 707/740 |
| 2013/0304595 | A1 * | 11/2013 | Goncalves | G06Q 20/203 705/22 |
| 2014/0016830 | A1 * | 1/2014 | Wang | G06K 9/00885 382/115 |
| 2014/0143346 | A1 * | 5/2014 | Mahmud | G06Q 50/01 709/206 |
| 2014/0193083 | A1 | 7/2014 | Marks | |
| 2014/0279192 | A1 * | 9/2014 | Selby | G06Q 30/0631 705/26.7 |
| 2014/0317101 | A1 * | 10/2014 | Myslinski | G06Q 10/10 707/723 |
| 2015/0248225 | A1 * | 9/2015 | Goyal | G06F 3/04842 715/747 |
| 2015/0248651 | A1 * | 9/2015 | Akutagawa | G06Q 10/1095 705/7.19 |
| 2015/0254811 | A1 * | 9/2015 | Sahu | H04N 13/0007 382/154 |
| 2015/0339810 | A1 * | 11/2015 | Lim | G06T 7/001 382/152 |
| 2015/0382123 | A1 * | 12/2015 | Jobani | H04R 1/1016 700/98 |
| 2016/0050221 | A1 * | 2/2016 | Myslinski | G06F 17/28 726/22 |
| 2016/0125265 | A1 * | 5/2016 | Xie | G06K 9/6202 382/209 |
| 2016/0232625 | A1 * | 8/2016 | Akutagawa | G06Q 50/12 |

OTHER PUBLICATIONS

"Amazon Price Check," retrieved from http://www.amazon.com/Amazon-com-Price-Check/dp/B005QTZSRA, Apr. 29, 2014 (2 pages).

Ronald Barbara, "Can Slyce Take Down Amazon Flow in Image Recognition Shopping," Tech Cocktail Toronto, Apr. 7, 2014 (2 pages).

David G. Lowe, "Distinctive Image Features from Scale-Invariant Keypoints," International Journal of Computer Vision 60(2), 91-110, 2004 (20 pages).

* cited by examiner

CONTEXT-BASED IMAGE RECOGNITION FOR CONSUMER MARKET RESEARCH

FIELD OF THE DISCLOSURE

This disclosure relates generally to consumer market research, and, more particularly, to context-based image recognition for consumer market research.

BACKGROUND

Image recognition may be used to identify consumer packaged goods for a variety of purposes. For example, when performing an in-store shelf audit, a market research firm may use image recognition to identify the products displayed on store shelves. As another example, a merchant may offer an image recognition application to consumers to facilitate comparison shopping.

DETAILED DESCRIPTION

Figure 1:
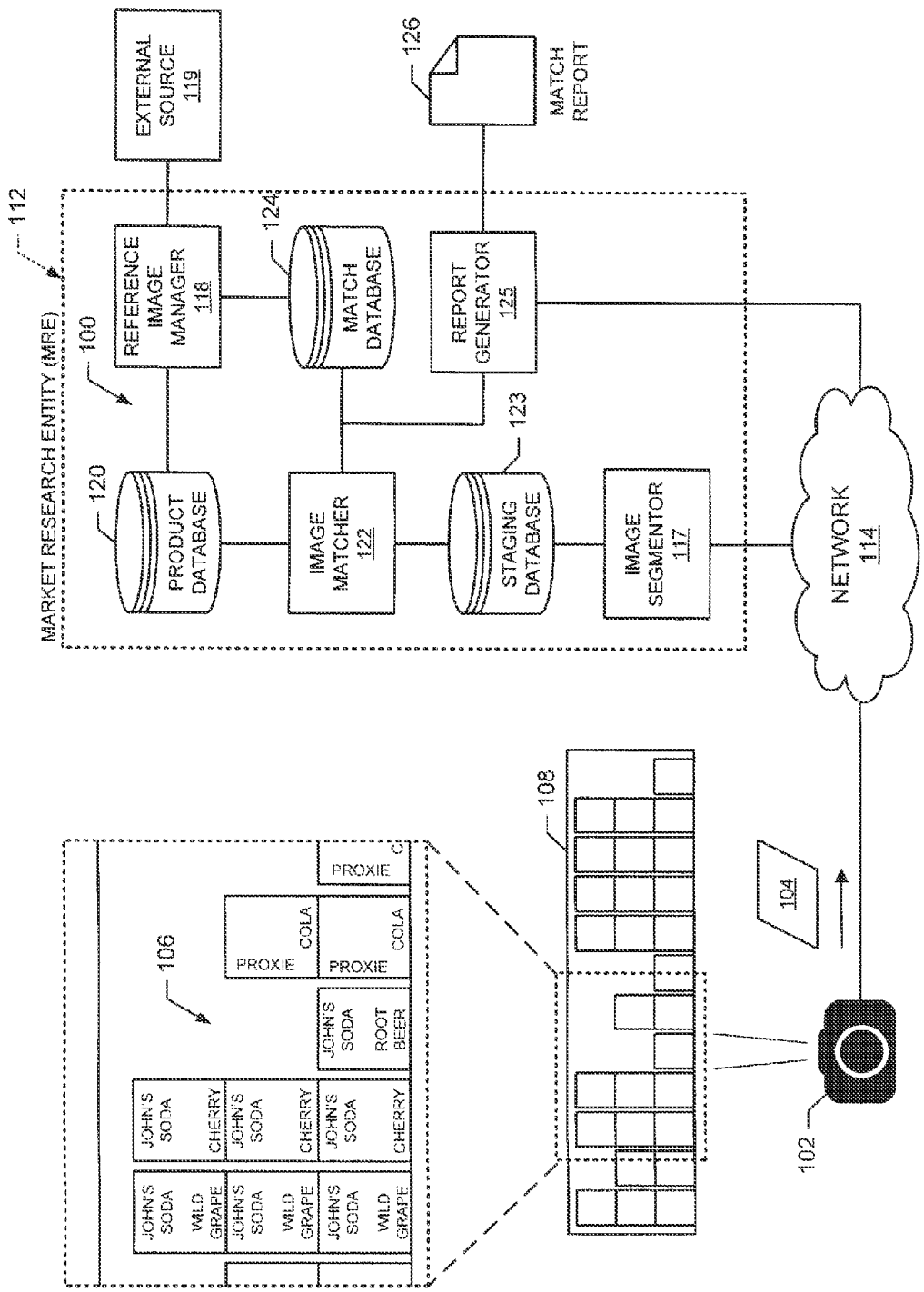
FIG. 1 illustrates an example system constructed in accordance with the teaching of this disclosure to perform context-based image recognition for consumer market research.

Examples disclosed herein may be used to identify consumer packaged goods through context-based image recognition. In some disclosed examples, market research entities (MREs) and/or merchants (e.g., wholesalers, club stores, retailers, e-commerce retailers) offer services based on recognizing consumer packaged goods from images captured by image capture devices (e.g., cameras, smartphones, tablets, video recorders, etc.). For example, an MRE may provide shelf-auditing services to marketers, manufacturers, merchants and/or advertisers to help determine if, for example, display locations of consumer packaged goods and/or display quality requirements (e.g., the goods are facing the correct orientation, the shelf is fully stocked, etc.) are being met. As another example, merchants may offer image recognition applications, or apps, for mobiles devices (e.g., smartphones, tablets, etc.) through an app store (e.g., Google Play™, Apple® App Store℠, Apple® iTunes®, Amazon App Store, etc.) or other mechanism to facilitate comparison shopping and/or purchasing of goods through the app and/or the merchant's website (e.g., by placing the good on a wish list, etc.).

National brand manufacturers (e.g., Procter & Gamble, Johnson & Johnson, L'Oreal Group, etc.) design packaging for consumer packaged goods to be distinct from competitor's packaging to foster brand awareness. In addition, a national brand manufacturer may design the packaging for one of its products to be similar to other products that share a brand to promote a cross-product brand image. As a result, differentiating among similarly branded products of a national brand manufacturer can be difficult. Also, merchants that use private label manufacturers (e.g., Costco℠, Walmart®, Walgreens®, etc.) sometimes design packaging (e.g., Kirkland Signature®, Sam's Choice®, Good & Delish®, etc.) for premium products to be similar to leading brands in the same categories, whereas packaging for economy products may be designed to be distinct from national brands, but similar to other products in the merchant's economy product lines.

Examples disclosed herein utilize regions of interest specified or otherwise defined in images representing packaged goods to identify packaged goods though content-based image recognition. For example, regions of interest are defined for reference images of consumer packaged goods and stored in a database in association with a product identifier. The regions of interest identify areas that correspond to one or more key characteristics of a consumer packaged good. The key characteristic(s) may include, but are not limited to, brand, sub-brand, package size, product line differentiators (e.g., flavor, scent, styles, etc.), special claims (e.g., "gluten free," "high fiber," "all natural," etc.), etc. Different key characteristics may be used for different product categories (e.g., carbonated beverages, shampoo, salty snacks, etc.). For example, key characteristics for shampoo may include, but are not limited to, brand (e.g., "Garnier Fructis," "Head & Shoulders," "Suave," etc.), scent (e.g., "ocean lift," "cherry blossom," "energy rush," etc.), treatment type (e.g., "hydration," "for normal hair," "volumizing," etc.), promotional text (e.g., "intensely nourishes and replenishes soft, silky, and shiny hair," etc.) and/or size and volume. In contrast, the key characteristics for soda may include, but are not limited to, brand (e.g., "Pepsi," "Shasta," "Jones Soda," etc.), flavor (e.g., "Cherry," "Cream Soda," "Root Beer," etc.), sub-type (e.g., "Diet," "Max," "Zero," etc.), special claims (e.g., "Sugar Free," "Caffeine Free," "Real Sugar," etc.), and/or size.

In some examples, the key characteristics of a product are identified (e.g., selected) when the product reference data is created by the MRE to identify and/or transcribe product characteristics (e.g., barcode information, product category, manufacturer, brand, etc.). Additionally or alternatively, the key characteristics are identified when the product is categorized and/or when product characteristics (e.g., descriptive words, morphemes and/or phrases that describe a product's feature, such as flavor, color, material, shape, etc., which may be obtained from a standardized list of features) are identified. In some such examples, the key characteristics are chosen by employees of the MRE based on a combination of (i) visual elements that are common within a brand (e.g., brand logo, manufacturer logo, etc.) to increase the likelihood that a candidate reference image can be used by the MRE to identify products associated with a particular source (e.g., manufacturer) and (ii) visual elements that are distinct within similarly branded products (e.g., flavor, special claims, promotional text, etc.) to increase the likelihood that the reference images used by the MRE can distinguish between similarly branded products. In some examples, key characteristics are chosen based on the category of the product. For example, the key characteristics of products in a "salty snack" category may be the brand (e.g., the brand logo), the manufacturer (e.g., the manufacturer's logo), sub-brand, flavor, product graphic (e.g., a picture of the product on the packaging), special claims, etc.

In some examples disclosed herein, the regions of interest are assigned respective significance values. In some examples, a region of interest with a higher significance value indicates that the region of interest is more predictive of a product's identity than a region of interest with a lower significance value. In some examples, a significance value for a region of interest indicates a threshold similarity (e.g., match percentage) to be met to consider the region of interest as being matched. For example, a consumer packaged good may have a brand region of interest with a 90% significance value, a flavor region of interest with a 90% significance value, and a special claim region of interest with a 50% significance value. In some examples, a spatial relationship may be defined among the regions of interest in a reference image. For example, the distance and orientation of the regions of interest of a reference image relative to each other may be defined as a further matching criteria to be met by an image compared with the reference image.

In some examples disclosed herein, a captured image of a consumer product good is obtained (e.g., via a camera, a smartphone, a tablet, a video recorder, etc.) or retrieved (e.g., from the Internet) for comparison to a reference image in the reference database. In some examples, the captured image may contain more than one product. In some such examples, techniques such as edge detection, blob detection, etc. are used to determine the boundaries of each product in the captured image. In such examples, the captured image may be segmented into multiple images that each depict one product.

In some examples disclosed herein, feature points are extracted from the captured image to compare to feature points of a reference image stored in the reference database. As used herein, feature points are pixels and/or area of pixels in an image that are likely to appear regardless of image quality (e.g., differences in lighting, rotation, scale, etc.). Feature points have a position (e.g., expressed in pixel coordinates) on the image (e.g., the captured image, the reference image, etc.). In some examples, a feature point is an area of pixels around a pixel that has a local minimum or maximum amplitude (e.g., a number representing the brightness of the pixel, etc.). In some such examples, the location of the feature point is the location of the pixel that has the local minimum or maximum amplitude. In some examples, a feature point may also include gradient vectors that describes the orientation of the feature point. Feature points may be extracted through one or more methods, such as edge detection, corner detection (e.g., Harris corner detection, etc.), blob detection, affine-invariant feature detection, a scale-invariant feature transform (SIFT), speeded-up robust features (SURF) detection, etc. As used herein, feature points may include feature descriptors (e.g., SIFT feature descriptors, SURF feature descriptors, etc.).

In some examples disclosed herein, one or more reference images may be associated with a consumer packaged good. Data used for matching reference images is stored as a reference image record. The reference image record may include the reference image, the regions of interest defined in the reference image, reference image feature points extracted from the regions of interest, and/or a reference image match index. In some examples, the reference image match index is used to evaluate the effectiveness of the reference image. In some examples, reference images with a low reference image match index may be removed from the database.

In some examples disclosed herein, the feature points of one or more reference images are compared to the feature points of the captured image. In some examples, the selection of possible reference images is limited to only a subset of the reference images that meet a selection criterion (e.g., a category of consumer packaged goods, products sold at a particular merchant, etc.) For example, if a captured image is known to be taken from the drink section of a supermarket, the selection criterion may filter possible candidate reference images to include only those in drink-related categories (e.g., soda, sports drinks, water, juice, etc.). As another example, the selection criterion may be based on the category of consumer packaged goods of a preceding identified captured image from the same image capture device. In such an example, if the preceding captured image was identified as "Gain® Liquid Laundry Detergent (Original)," the selection criterion may be laundry-related categories (e.g., detergent, fabric softener, etc.).

To compare the captured image to a reference image, respective region of interest (ROI) match values are calculated (e.g., using methods such as normalized cross-correlation, etc.) between regions of interest defined for the reference image and corresponding regions of the captured image. In some examples, the features points within the particular ROI (e.g., the ROI to be matched) of the reference image are compared to the feature points of captured image. In such examples, the match value is the percentage of features points within the particular ROI of the reference image that are matched to feature points of the captured image. For example, if an ROI defined for a reference image has ten feature points and during the matching process seven of those feature points are matched to feature points in a corresponding area on the captured image, the match value would be seventy percent.

In some examples discussed below, the ROI with the highest significance value is used to best fit the regions of interest of the reference image to the captured image. For example, for a reference image with a special claim ROI with a 75% significance value, a flavor ROI with a 50% significance, and a brand ROI with an 85% significance value, the feature points of the brand ROI would be compared to the feature points of the captured image. In such an example, using a technique such as normalized cross-correlation or a nearest-neighbor algorithm, a first region of the on the captured image that best matches (e.g., has the highest match percentage, etc.) the brand ROI of the reference image is determined. The remaining ROIs of the reference image at respective locations relative to the brand ROI are then compared (e.g., a match value is calculated) to the corresponding region(s) of the captured image at the same or similar locations in the captured image relative to the first region that matched the brand ROI. In some examples, after finding the best fit region of the captured image corresponding to the region of interest with the highest significance value, because of the spatial relationships among the regions of interest in the reference image, a region of interest in the reference image may not have a corresponding location in the captured image. In some such examples, the match value for such region(s) are zero.

In some examples, a candidate reference image is designated a possible match if all of the ROI match value(s) calculated for the respective regions of interest satisfy (e.g., are greater than or equal to) the significance values of the corresponding regions of interest. For example, a candidate reference image with three regions of interest (e.g., brand, flavors, special claims) having significance values of (90%, 90%, 50%) would be designated a possible match to a captured image with calculated ROI match values of (92%, 95%, 63%) because all the three significance values are met. In contrast, the same candidate reference image would not be designated a possible match to the captured image if the calculated ROI match values were (83%, 92%, 51%) because the significance value for the first ROI is not met.

In some examples, the spatial relationships between the ROIs are used to verify that the reference image is a match for the captured image. In some such examples, initially, the ROIs are matched to captured image without accounting for the spatial relationships between the ROIs. In some such examples, if the ROI match values satisfy the respective significance values, the spatial relationships between the matching locations on the captured image are compared to the expected spatial relationships between the ROIs. In some such examples, if the spatial relationships do not match the expected spatial relationships, the captured image may be flagged for review. Such a scenario may indicate that product in the captured image has new packaging.

If more than one reference image is designated a possible match, an arbitration technique may be used to select one of the reference images as a match. In some examples, a match score may be calculated using the ROI match values. For example, a possible match with ROI match values of (92%, 95%, 63%) would have a match score of 250 (e.g., determined by summing the match values for the individual ROIs). In some examples, the match score may be weighted using the respective significance values. In such examples, the reference image with the highest match score is selected as a match. Additionally, or alternatively, the products associated with the potentially matching reference images may be compared. In some examples, the product associated with the most possibly matching reference images is selected as a match.

In some examples, if a match is not found for the captured image, the captured image is flagged for manual review or additional computer processing. In some such examples, the captured image may be flagged as a potential new product (e.g., a product not yet in the reference database) and/or as a potential new packaging design (e.g., a new design for an existing product in the reference database). For example, if comparison of the captured image to a candidate reference image results in a brand region of interest significance value being satisfied, a special claim region of interest significance value being satisfied, but a flavor region of interest not being satisfied, the captured image may be flagged as a potential new product corresponding to the known brand of the candidate reference image.

FIG. 1 illustrates an example system 100 to perform context-based image recognition for consumer market research. In the illustrated example, an example image capture device 102 (e.g., a camera, a video recorder, a smartphone, a tablet, etc.) captures an example image 104 of an example consumer packaged good 106. In some examples, the consumer packaged good 106 is located on an example shelf 108 of a merchant (e.g., a retailer, a wholesaler, a club store, etc.). In some examples, the consumer packaged good 106 may be in another location, such as a consumer's home. In the illustrated example, the captured image 104 is sent to an example market research entity (MRE) 112 through an example network 114 (e.g., the Internet, a local area network, a wide area network, a cellular data network, etc.) via a wired and/or wireless connection (e.g., a cable/DSL/satellite modem, a cell tower, etc.).

In the illustrated example of FIG. 1, the MRE 112 processes the captured image 104 to associate a product (e.g., a product represented by a reference image record) with the captured image 104. In the illustrated example, the MRE 112 includes an example image segmentor 117, an example reference image manager 118, an example product database 120, an example image matcher 122, an example staging database 123, an example match database 124, and an example report generator 125. The example image segmentor 117 separates the captured image 104 into one or more images that each depict one consumer packaged good. In some examples, the image segmentor 117 uses techniques, such as edge detection, blob detection, etc. to determine the boundaries between consumer packaged goods in the captured image 104. Additionally or alternatively, the captured image 104 may be segmented through operator input. For example, the captured image 104 may be displayed via a graphical user interface and the operator may draw the boundaries between the consumer packaged goods. For example, a captured image 104 may depict a case of John's Soda and a case of Proxie Cola. In such an example, the image segmentor 117 would create an image of the case of John's Soda and an image of the case of Proxie Soda. In such a manner, a captured image 104 may be segmented into more than one image.

In some examples, the example image segmentor 117 determines whether the captured image 104 satisfies a quality threshold. The quality threshold is used to flag captured images 104 that are unlikely to have accurate feature points extracted. The quality threshold may be one or more of a brightness level, a contrast level, a noise level, and/or a sharpness level, etc. In some examples, the image quality may be evaluated by an operator. In some examples, a captured image 104 that does not satisfy the quality threshold may be flagged for manual review. In some examples, a captured image 104 that does not satisfy the quality threshold may be discarded. The example image segmentor 117 stores the segmented images in the staging database 123.

The example reference image generator 118 generates reference image records to store in the example product database 120. In some examples, the reference image generator 118 generates reference records based on images of consumer packaged goods provided by an external source 119 (e.g., a manufacturer, a reference image collection team, the Internet, etc.). In some examples, the reference image generator 118 generates reference records based on captured images 104 that are successfully matched with a product in the product database 120. As discussed in further detail below, from time to time, the reference image generator 118 may evaluate reference records in the product database 120 to delete reference records that are not frequently matched with captured images 104.

In the example illustrated in FIG. 1, the image matcher 122 retrieves a segmented image from the staging database 123 and compares the segmented image to the reference image records stored in the product database 120 to attempt to match the segmented image to a catalogued (e.g., known) consumer packaged good (e.g., by assigning a product identifier to the segmented image, etc.). If a match is found, the image matcher 122 stores a match record in the match database 124. In some examples, the match record includes the captured image, metadata associated with the captured image (if present), and/or a product identifier as returned from the reference record associated with the matching reference image (e.g., an MRE assigned product number, a UPC, etc.). In some examples, the information included in the match record is used by an example report generator to generate a match report 126. In some examples, the match record(s) are stored in the match database 124 and/or included in the match report 126 and/or are used by the MRE 112 to generate shelf-audit reports. In some examples, the report generator 125 returns the product information (e.g., from the product database 116) to the image capture device 102 to, for example, provide price quotes and/or identify merchants that sell the product identified as being represented by the captured image 104. Because the image matcher 122 is adaptive, in some examples, from time to time (e.g., periodically, randomly, etc.), the report generator 125 flags one or more match records for review. In such a manner, quality control can verify whether the image matcher 122 needs to be corrected and/or the reference records in the product database 120 need to be reviewed.

While an example manner of implementing the system 100 of FIG. 1 is illustrated in FIG. 1, one or more of the elements, processes and/or devices illustrated in FIG. 1 may be combined, divided, re-arranged, omitted, eliminated and/or implemented in any other way. Further, the example reference image generator 118, the example image matcher 122, the example report generator 125, and/or, more generally, the example system 100 of FIG. 1 may be implemented by hardware, software, firmware and/or any combination of hardware, software and/or firmware. Thus, for example, any of the example reference image generator 118, the example image matcher 122, the example report generator 125, and/or, more generally, the example system 100 of FIG. 1 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example reference image generator 118, the example image matcher 122, the example report generator 125, and/or, more generally, the example system 100 of FIG. 1 is/are hereby expressly defined to include a tangible computer readable storage device or storage disk such as a memory, a digital versatile disk (DVD), a compact disk (CD), a Blu-ray disk, etc. storing the software and/or firmware. Further still, the example system 100 of FIG. 1 may include one or more elements, processes and/or devices in addition to, or instead of, those illustrated in FIG. 1, and/or may include more than one of any or all of the illustrated elements, processes and devices.

Figure 2A:
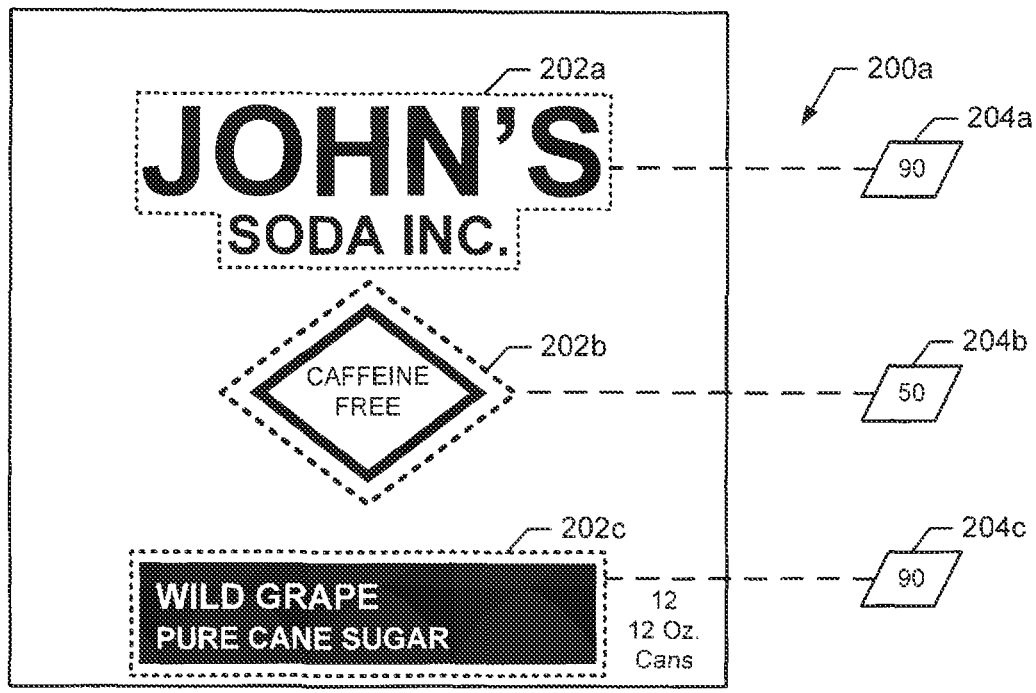
FIGS. 2A, 2B, 2C and 2D illustrate example consumer packaged goods with defined regions of interest.
Figure 2B:
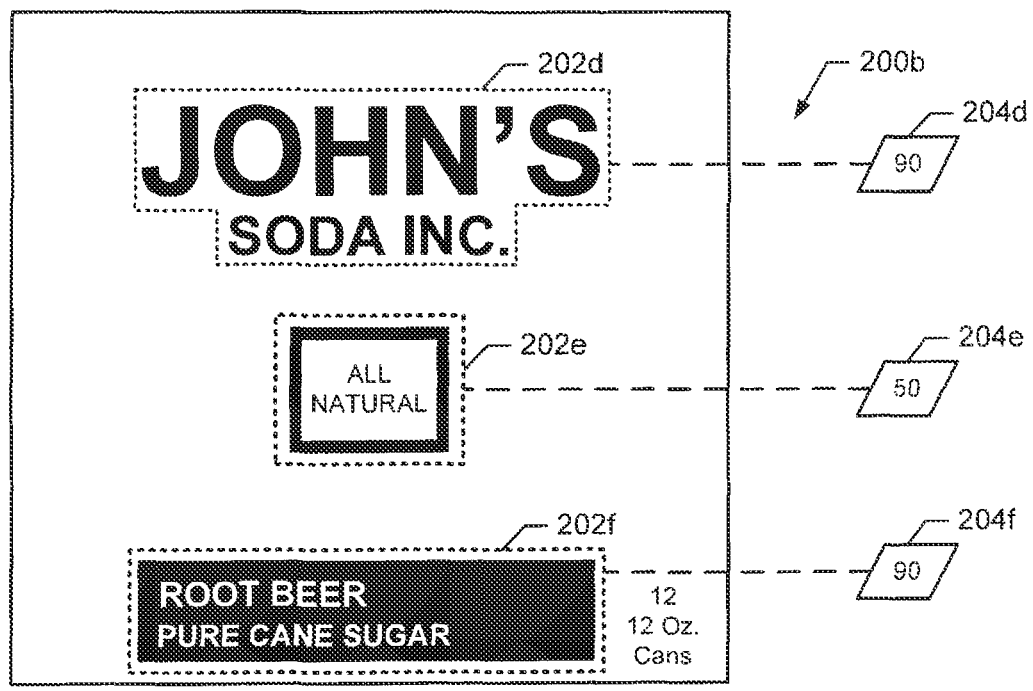

FIGS. 2A and 2B illustrate respective example reference images 200*a* and 200*b*. In the examples of FIGS. 2A and 2B, regions of interest (ROIs) 202*a*-202*f* are overlaid on the reference images 200*a*-200*b*. The example ROIs 202*a*-202*f* are defined by the example reference image generator 118 of FIG. 1. The example ROIs 202*a*-202*f* define a spatial region that may be used to determine which feature points of the captured image (e.g., the captured image 104 of FIG. 1) to use when comparing the particular ROI to a corresponding location on the captured image. In the illustrated example of FIG. 2A, the example ROIs 202*a*-202*c* encompass areas on the reference image 200*a* corresponding to key characteristics (e.g., brand, sub-brand, package size, product line differentiators, and/or special claims, etc.) of the product depicted in the reference image 200*a*. Similarly, in the illustrated example of FIG. 2B, the example ROIs 202*d*-202*f* encompass areas on the reference image 200*b* corresponding to key characteristics (e.g., brand, sub-brand, package size, product line differentiators, and/or special claims, etc.) of the product depicted in the reference image 200*b*. In the illustrated example of FIG. 2A, an ROI 202*a* is defined for a brand of the product, an ROI 202*b* is defined for a special claim of the product, and an ROI 202*c* is defined for a product differentiator (e.g., flavor) of the product depicted in the reference image 200*a*. Similarly, in the illustrated example of FIG. 2B, an ROI 202*d* is defined for a brand of the product, an ROI 202*e* is defined for a special claim of the product, and an ROI 202*f* is defined for a product differentiator (e.g., flavor) of the product depicted in the reference image 200*b*. The example ROIs 202*a*-202*f* may be any suitable regular or irregular shape defined to encompass the respective key characteristic of the consumer packaged good. In the illustrated example, the ROIs 202*a*-202*c*, 202*d*-202*f* do not overlap. Alternatively, the ROIs 202*a*-202*c*, 202*d*-202*f* may overlap when key characteristics overlap on the design of the consumer packaged good. The example ROIs 202*a*-202*f* are assigned respective significance values 204*a*-204*f*. In some examples, the significance values 204*a*-204*f* represent respective percentage thresholds (e.g., 90%, etc.) required to be met when comparing the respective ROIs 202*a*-202*f* to corresponding regions of the captured image 104 to determine that the corresponding regions of the captured image 104 include the respective key characteristics associated with the respective ROIs 202*a*-202*f*. In some examples, the significance values 204*a*-204*f* are selected based on historical experience.

In some examples, the significance values 204*a*-204*f* are selected via training and/or machine learning techniques. For example, initially, the significance values for different ROIs of a target reference image (e.g., a reference image to be trained) may be set to the same value (e.g., 50, 75, etc.). A training set of reference images may be constructed to include the target reference image and reference images corresponding to products that are substantially similar (e.g., products of the same brand, products that visually look similar, etc.) to the target reference images. Through an iterative process, the target reference image is compared to the training set of reference images, and the significance values 204*a*-204*f* are adjusted (e.g., raised or lowered) until the target reference image is uniquely identifiable (e.g., is the only correct match found, etc.) from the training set of reference images. Alternatively or additionally, the significance values 204*a*-204*f* are selected based on ROI type. For example, an ROI representing a brand may be set to a relatively high value (e.g., 90%) and an ROI representing size may be set to a relatively low value (e.g., 50%). In some examples, the significance values 204*a*-204*f* are reevaluated if the corresponding reference image 202a-2002b is not selected as a match frequently enough (e.g., which may correspond to a reference image index for the reference image not satisfying a threshold, etc.). In such some examples, when the significance values 204a-204f are reevaluated, the significance values 204a-204f may be set and/or overridden by an operator.

Figure 2C:
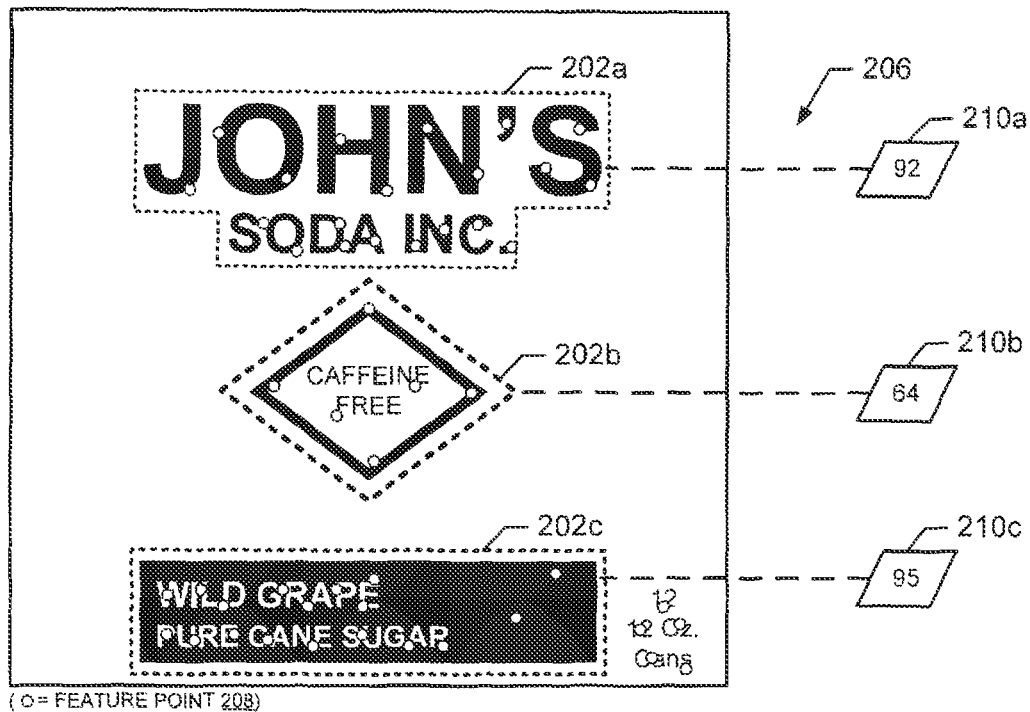
Figure 2D:
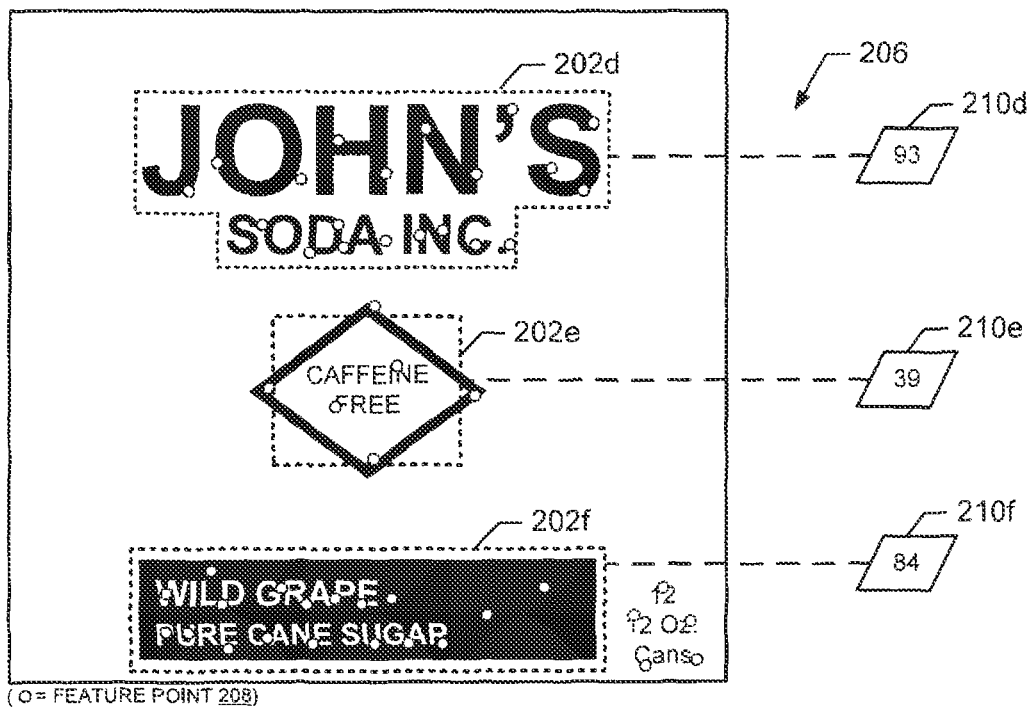

FIGS. 2C and 2D illustrate an example captured (and segmented) image 206 with example extracted feature points 208 (feature points 208 are represented by an "o" in FIGS. 2C and 2D). In the illustrated example of FIG. 2C, ROIs 202a-202c of the candidate reference image 200a of FIG. 2A are overlaid on the captured image 206. In the illustrated example of FIG. 2D, ROIs 202d-202f of the candidate reference images 200b of FIG. 2B are overlaid on the captured images 206. Example ROI match values 210a-210f are calculated for the corresponding ROIs 202a-202f. In some examples, the match values 210a-210f are calculated using only those feature points 208 within the respective ROI 202a-202f (e.g., subsets of the feature points of the captured imaged and/or the candidate reference image based on the respective ROI 202a-202f). In some examples, the feature points 208 which are not within one of the ROIs 202a-202f are disregarded.

In some examples, the ROI with the highest significance value (e.g., the significance value 204a for the reference image 200a) is used to best fit the ROIs 202a-202c with the captured image 206 when comparing the reference image 200a with the captured image 206. To best fit the ROI with the highest significance value, ROI match values are calculated in different locations on the captured image 206 until the significance value corresponding to the ROI is satisfied. In such examples, while maintaining the spatial relationships between the ROIs 202a-202c, match values 210b-210c for the remaining ROIs 202b-202c are calculated by comparing the ROIs 202b, 202c of the reference image 200a with the feature points in corresponding regions of the captured image 206. If, while finding the best fit ROI 202a with the highest significance value 202a, the significance value 202a is not satisfied, then the reference image 200a is determined not to be a match to the captured image 206.

Figure 3:
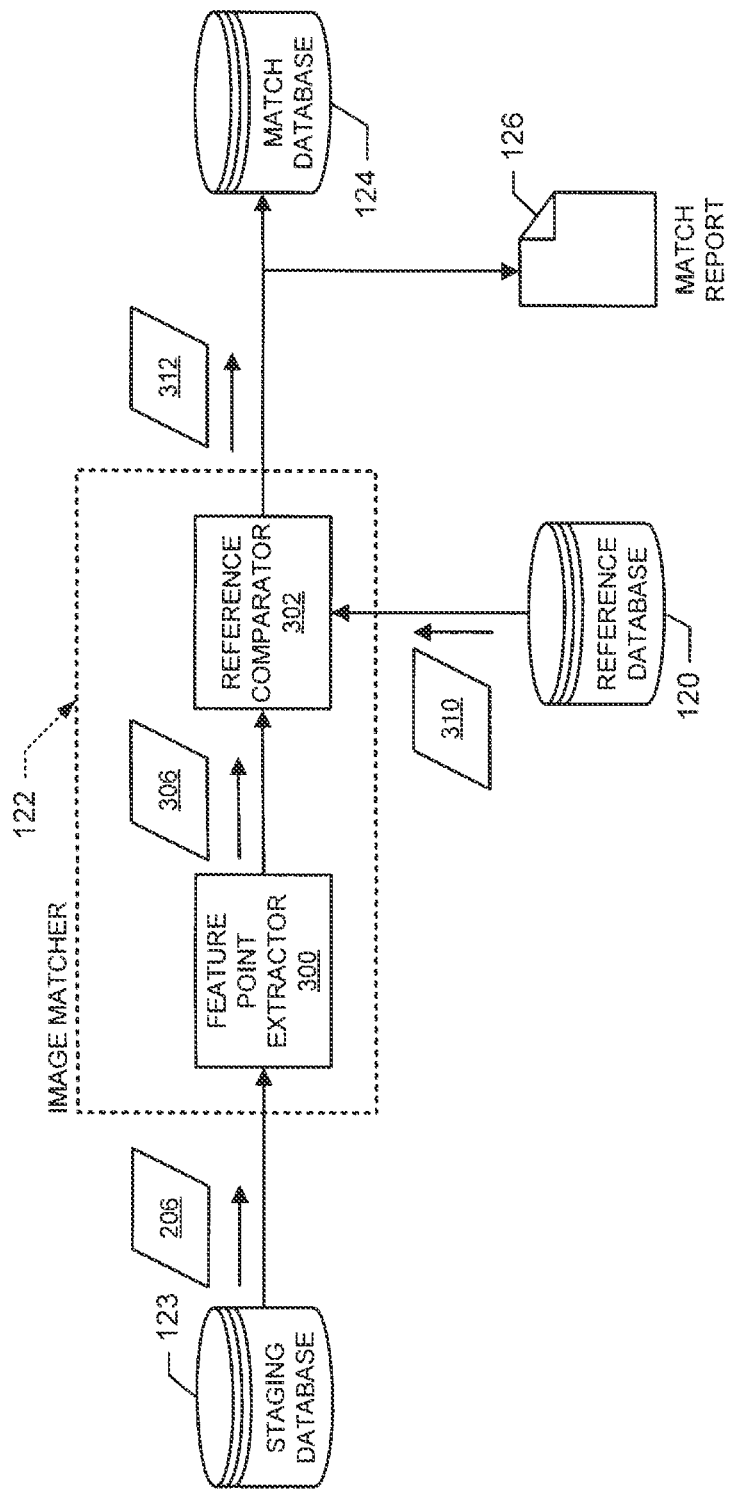
FIG. 3 illustrates an example implementation of the example image matcher of FIG. 1 to identify products in images.

FIG. 3 illustrates an example implementation of the image matcher 122 of FIG. 1, which may be used to identify products in captured images 104. In the illustrated example, the image matcher 122 compares ROIs (e.g. the ROIs 202a-202f of FIG. 2) of reference images (e.g., the reference images 200a-200b of FIG. 2) to feature points of captured (e.g., and segmented) images to select a matching reference image corresponding to a product in the product database 120. The example image matcher 122 of FIG. 3 includes an example feature point extractor 300, and an example reference comparator 302. In the illustrated example, the feature point extractor 300 processes the captured image 206 to extract feature points (e.g., the feature points 208 of FIGS. 2C and 2D) from the captured image 206. The example feature point extractor 300 uses one or more techniques, such as edge detection, corner detection (e.g., Harris corner detection, etc.), blob detection, affine-invariant feature detection, and/or a scale-invariant feature transform (SIFT), etc. to extract feature points that are likely to appear regardless of image quality.

In some examples, the feature points extracted by the feature point extractor 300 include a descriptor comprising image gradient magnitudes and orientations (sometime referred to as "feature vectors") of region(s) surrounding the feature point. In such examples, the feature vectors represent orientations of the region around the feature point, changes in brightness in the region around the feature point, changes in color around the feature point, etc. For example, the descriptor of a feature point extracted by feature point extractor 300 may include 128 feature vectors, or some other number of feature vectors. In such examples, the descriptors of the feature points are used to calculate Euclidean distances between the feature points of the captured image 206 and the feature points of a reference image. Examples of extracting feature points with descriptors are described in Lowe, David G. "Distinctive Image Features from Scale-Invariant Keypoints." International Journal of Computer Vision 60.2 (2004): 91-110. The example feature point extractor 300 generates an example captured image record 306 that includes the extracted feature points and the captured image 206.

In the example illustrated of FIG. 3, the reference comparator 302 processes the reference record(s) 310 to determine if the captured image 206 matches any of the reference records(s) 310 in the product database 120. The reference comparator 302 retrieves the reference records(s) 310 in the product database 120. In some examples, the reference image records 310 are retrieved based on a selection criterion. For example, if the captured image 206 includes information regarding the location of the image capture device 102 (FIG. 1), the selection criterion may be used to retrieve reference images related to a the same product category location (e.g., drink related reference image records 310 would be retrieved if the captured image was captured in the "drinks" section of a supermarket, etc.). This approach reduces the search space for matching the captured image 104 against reference images, greatly saving processing resources.

In the illustrated example of FIG. 3, the reference comparator 302 calculates ROI match value(s) for the ROI(s) of the retrieved reference record 310. In some examples, the reference comparator 302 selects one of the ROIs corresponding to the reference record 310. In some examples, the ROIs are selected in order of their respective significance values (e.g., from highest to lowest significance values, etc.). The reference comparator 302 attempts to match the feature points of a selected ROI to the feature points 208 within a region of the captured image 206 corresponding to the selected ROI of the reference image.

In some examples, to select a match for a reference image feature point, the reference comparator 302 selects its nearest neighbor in the available captured image feature points. In some such examples, the nearest neighbor is defined as the captured image feature point with the minimum Euclidean distance based on the properties of the feature points (e.g., location, orientation, descriptor, etc.). In some examples, the reference comparator 302 identifies a first nearest neighbor (e.g., the captured image feature point with the minimum Euclidean distance) and a second nearest neighbor (e.g., the captured image feature point with the next minimum Euclidean distance after the first nearest neighbor). In some such examples, a ratio of the first nearest neighbor to the second nearest neighbor (e.g., the first nearest neighbor divided by the second nearest neighbor) is compared to a distance ratio threshold (e.g., 0.8). In some such examples, if the ratio satisfies (e.g., is less than or equal to) the distance ratio threshold, the first nearest neighbor is selected as the matching captured image feature point. Otherwise, if the ratio does not satisfy (e.g., is greater than) the distance ratio threshold, the reference comparator 302 determines that a match does not exist for the particular reference image feature point. In some such examples, the reference comparator 302 continues to match reference image feature points until either (i) the reference comparator 302 has attempted to match all the reference image feature points, or (ii) all captured image feature points have been matched with reference image feature points. In some examples, the match value for the particular ROI is the percentage of reference image feature points of the ROI that are matched with feature points of the captured image 206. In some examples, before calculating the ROI match value(s) of the remaining ROIs stored in the reference image record 310, the reference comparator 302 fits the ROI with the highest significance value to the captured image 206. In such examples, using all the captured image feature points, the reference comparator 302 determines the location in the captured image 206 where the ROI match value satisfies (e.g., is greater than or equal to) the corresponding significance value. In some examples, the remaining ROI match value(s) are then calculated preserving the spatial relationships between the ROIs. In some examples, the reference comparator 302 attempts to match the feature points of the remaining ROI(s) (e.g., by calculating the ROI match value(s)) without taking into account the spatial relationships between the ROIs. In some such examples, reference comparator 302 compares the spatial relationships of the locations on the captured image 206 corresponding the respective matched ROI.

In the illustrated example, if the ROI match value(s) satisfy (e.g., are greater than or equal to) the corresponding significance value(s) (e.g., a threshold, etc.) defined for the particular reference image record 310, the reference comparator 302 designates the reference record 310 as a possible match. In some examples, to designate the reference record 310 as a possible match, the reference comparator 302 also determines whether the spatial relationships of the locations on the captured image 206 corresponding the respective matched ROI match the expected spatial relationships defined for the ROIs. After processing the reference image records 310 retrieved from the product database 120, the reference comparator 302 selects one of the possible matches as the best match for the captured image 206. In some examples, the reference comparator 302 calculates a match score for each reference image record 310 and selects the reference image record 310 with the highest match score. In some examples, the match score may be calculated by adding up the ROI match values. For example, for a possible match having three ROI match values of (90, 74, 63), the match score would be 227. For example, if a first reference record 310 has a match score of 227, a second reference record 310 has a match score of 233, and a third reference record 310 has a match score of 215, the reference comparator 302 would select the second reference record 310 as the best match for the captured image 206.

In some examples, the reference comparator 302 compares the products associated with the reference image records 310 that were designated as a possible match. In some such examples, the reference comparator 302 may select more than one reference record 310 as the best matches. In such examples, the reference comparator 302 selects, as the best match(es), the reference image record(s) 310 associated with the product most identified by the possibly matching reference record. For example, if a first reference record 310 is associated with "Garnier Frutis Sleek and Shine," a second reference record 310 is associated with "Garnier Frutis Body Boost," and a third reference record 310 is associated with "Garnier Frutis Sleek and Shine," the reference comparator 302 would select both the first and third reference records 310 as the best matches.

In the example illustrated in FIG. 3, the reference comparator 302 generates a match record 312 and stores the match record 312 in the match database 124. Alternatively or additionally, the match record 312 is included in the match report 126 (e.g., via the report generator 125 of FIG. 1). In some examples, the match record 312 includes the captured image record 306, the matching reference record(s) 310, and/or a product identifier (e.g., a UPC, an MRE assigned unique identifier, etc.) of the product associated with the matching reference record(s) 310.

While an example manner of implementing the image matcher 122 of FIG. 1 is illustrated in FIG. 3, one or more of the elements, processes and/or devices illustrated in FIG. 3 may be combined, divided, re-arranged, omitted, eliminated and/or implemented in any other way. Further, the example feature point extractor 300, the example reference comparator 302 and/or, more generally, the example image matcher 122 of FIG. 1 may be implemented by hardware, software, firmware and/or any combination of hardware, software and/or firmware. Thus, for example, any of the example feature point extractor 300, the example reference comparator 302 and/or, more generally, the example image matcher 122 of FIG. 1 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example feature point extractor 300, the example reference comparator 302 and/or, more generally, the example image matcher 122 of FIG. 1 is/are hereby expressly defined to include a tangible computer readable storage device or storage disk such as a memory, a digital versatile disk (DVD), a compact disk (CD), a Blu-ray disk, etc. storing the software and/or firmware. Further still, the example image matcher 122 of FIG. 1 may include one or more elements, processes and/or devices in addition to, or instead of, those illustrated in FIG. 3, and/or may include more than one of any or all of the illustrated elements, processes and devices.

Figure 4:
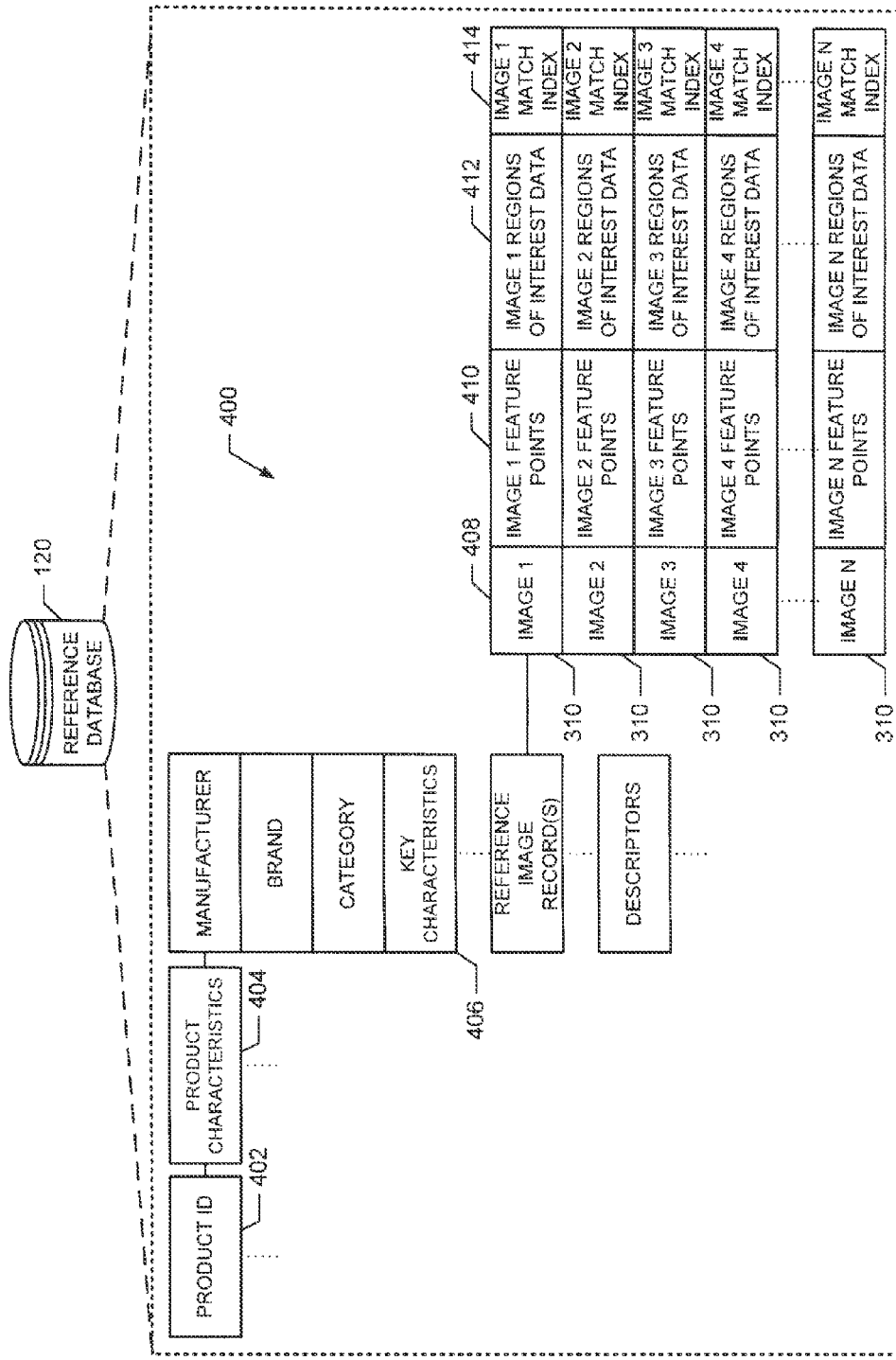
FIG. 4 illustrates an example data structure maintained by a market research entity to manage and/or store reference image records in relation to product identifiers.

FIG. 4 illustrates an example data structure 400 maintained by the example MRE 112 of FIG. 1 to manage and/or store reference image records 310. In the illustrated example, the data structure 400 is stored in the product database 120. The example data structure 400 includes a product identifier (ID) 402. The product ID 402 is a value (e.g., an alphanumeric value, etc.) that uniquely identifies a consumer packaged good. The product ID may be assigned by the MRE or may be a trade item number (e.g., a Universal Product Code, an International Article Number, Manufacture Part Number, etc.) assigned by the manufacturer or any other suitable entity.

In the illustrated example, the product ID 402 is associated with product characteristics 404. The example product characteristics 404 include information that describes attributes of the consumer packaged good and/or the manufacturer of the consumer packaged good. For example, the product characteristics 404 may include a manufacturer (e.g., Proctor and Gamble, Johnson and Johnson, Unilever, etc.), a brand (e.g., Tide®, Neosporin®, Suave®, etc.), a category (e.g., laundry supplies, pharmacy, personal grooming, etc.), descriptors (e.g., descriptive words, morphemes, and/or phrases which describe attributes of the consumer packaged good), etc. In the illustrated example, the product characteristics 404 also include key characteristics 406. The example key characteristics 406 are selected by the MRE 112 to differentiate the consumer packaged good from both differently branded products and products sharing the same brand. The example key characteristics 406 include, but are not limited to, brand, sub-brand, package size, product line differentiators (e.g., flavor, scent, styles, etc.), and/or special claims (e.g., "gluten free," "high fiber," "all natural," etc.), etc. In some examples, different key characteristics 406 may be used for different product categories (e.g., carbonated beverages, shampoo, salty snacks, etc.). The example key characteristics 406 are used to identify areas on the consumer packaged good that define an ROI.

In the illustrated example of FIG. 4, the product characteristics 404 also include one or more reference image records 310 generates by reference image manager 118 (FIG. 1). The example reference image record(s) 310 include reference image(s) 408. In some examples, the reference image(s) 408 are provided by a manufacturer and/or a marketer. In some such examples, the reference image(s) 408 are high quality images (e.g., images that have even lighting, are in focus, depict details of the consumer package goods that are clear, etc.) of the corresponding consumer packaged good. Additionally or alternatively, the example reference image 408 is an image of the consumer packaged good on a merchant's shelf. In some such examples, the reference images 408 are selected from the captured images 206 (FIGS. 2C and 2D) in the match database 124. For examples, a captured image 206 may be selected to be a potential reference image 408 based on the match score calculated by the image matcher 122. In this manner, multiple images of varying angles and/or quality may be available to compare to a captured image 206 during the matching process.

In the illustrated example of FIG. 4, the reference record 310 includes reference image feature points 410. As discussed in further detail below, the reference image feature points 410 are extracted from the corresponding reference image 408 by the reference image manager 122. The example reference image feature points 410 are used, in conjunction with the feature points 208 of the captured image 206, to calculate ROI match value(s) to determine whether a reference image record 310 is a possible match to the captured image 206. The example reference record 310 includes reference image ROI data 412. The example reference image ROI data 412 includes information specifying the boundaries of the ROI(s) (e.g., the ROIs 202a-202f of FIGS. 2A and 2B). In addition, the example reference image ROI data 412 includes the significance value(s) (e.g., the significance values 204a-204f of FIGS. 2A and 2B) for the corresponding ROI(s) 202a-202f. In some examples, the reference image ROI data 412 includes information regarding the spatial relationships (e.g., the locations of the ROI relative to each other) between the ROIs.

In the illustrated example, the reference record 310 includes a reference image index 414. The example reference image index 414 is used to sort the reference records 310 and/or to determine the quality and matching preference of the reference record 310. The example reference image index 414 is a numerical value that is incremented or decremented during the matching process. In some examples, when a reference record 310 is designated as a potential match by the image matcher 122, the reference image index 414 of the reference image record 310 is increased. Additionally, in some examples, when a reference record 310 is designated as a possible match by the image matcher 122, the reference image indices 414 of reference records 310 associated with the same product ID 402 that were not considered as possible matches are decreased. In such a manner, reference image records 310 that are considered as potential matches more often than other reference image records 310 for the same product have higher reference image indices 414. Furthermore, a positive reference image index 414 indicates that a reference record 310 for a product is designated a possible match more often than not when the product is a possible match for the captured image 206, whereas a negative reference image index 414 indicates the opposite.

In some examples, from time to time, reference records 310 are removed from the product database 120. In some such examples, reference records 310 may be removed based on their corresponding reference image index 414. Various rules may be defined to determine which reference record(s) 310 to remove. For example, a reference record 310 may be removed from the product database 120 if the corresponding reference image index 414 does not satisfy (e.g., is less than) a threshold. In some examples, the threshold may be zero (e.g., which are compared to a reference record 310 having been considered as a match as often as it has not been considered a match). A threshold greater than zero increases the quality requirement of a reference record 310 (e.g., a reference record 310 may be removed even if it has been considered as a match more than it has not been considered a match). Conversely, a threshold less than zero decreases the quality requirement of a reference record 310 (e.g., a reference record 310 may not be removed even if it has been considered as a match less than it has not been considered a match). Alternatively or additionally, the one or more reference records 310 with the lowest reference image score 414 associated with a product ID 402 may be removed from the product database 120. In some examples, a maximum number of reference records 310 per product ID 402 may be defined. In such examples, if a new reference record 310 is generated for a consumer packaged good, the reference record 310 with the lowest reference image score 414 is removed from the product database 120.

Figure 5:
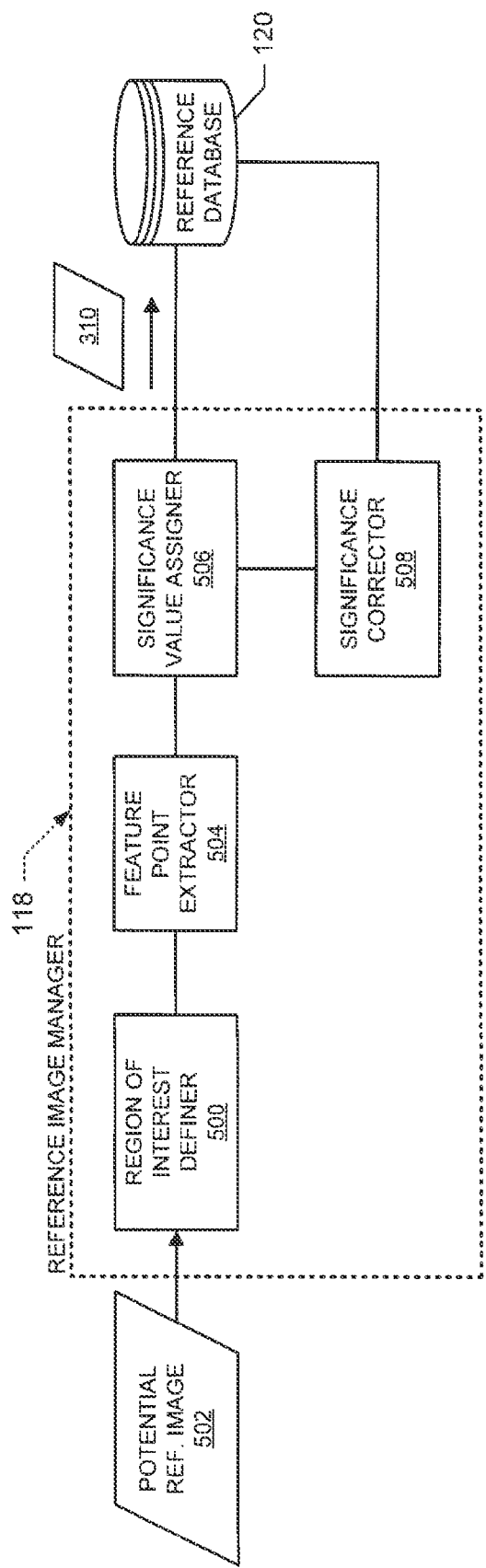
FIG. 5 illustrates an example implementation of the example reference image generator of FIG. 1 to generate reference image records with defined regions of interest.

FIG. 5 illustrates an example implementation of the reference image manger 118 of FIG. 1 which may be used to generate the reference image records 310 specifying defined ROI(s) for the associated reference images. In the illustrated example of FIG. 5, an example region of interest definer 500 receives or retrieves potential reference images 502. In some examples, the potential reference images 502 are provided by manufacturers, marketers and/or merchants. In some examples, the potential reference images 502 are captured images 206 (FIG. 2) retrieved from the match database 124 (e.g. captured images with high match scores). The example ROI definer 500 defines the boundaries of the ROIs (e.g., the ROIs 202a-202f of FIG. 2) and the spatial relationships between the ROIs based on the key characteristics 406 (FIG. 4) identified for the corresponding consumer packaged good. In some examples, the ROIs are drawn by an operator. The example ROI definer 500 creates a reference record 310 and stores the ROIs as the reference ROI data 412. In addition, the example ROI definer 500 stores the potential reference image 502 as the reference image 408.

In the illustrated example, an example feature point extractor 504 extracts feature points from the potential reference image 502 within the ROIs defined by the ROI definer 500. In some examples, areas outside the ROIs are ignored by the feature point extractor 504. To extract feature points from the potential reference image 502, the example feature point extractor 504 uses one or more image processing techniques, such as edge detection, corner detection (e.g., Harris corner detection, etc.), blob detection, affine-invariant feature detection, and/or a scale-invariant feature transform, etc. The example feature point extractor 504 stores the extracted feature points as the reference image feature points 410 of the reference image record 310.

In the illustrated example of FIG. 5, a significance value assigner 506 assigns a significance value (e.g., the significance values 204a-204f of FIGS. 2A and 2B) to the respective ROIs defined by the ROI definer 500. Significance value may be assigned by any method. In some examples, the significance values are assigned based on the corresponding key characteristics 406 associated with the ROI. For example, a ROI associated with a brand key characteristic may be assigned a high significance value (e.g., 80%, 90%, etc.) to emphasize selecting reference records 310 as potential matches that share the brand of the segmented image 206. As another example, a key characteristics 406 that is used to distinguish consumer packaged goods within the same brand (e.g., flavor, size/volume, etc.) may be assigned a high significance value (e.g., 80%, 90%, etc.). In some examples, the significance values are assigned based on historical experience.

From time to time, the significance values assigned by the significance value assigner 506 may be evaluated and/or corrected by a significance corrector 508. For example, the evaluation may be triggered when the reference record 310 is removed from the product database 120. As another example, the evaluation may be triggered when captured images 206 of a consumer packaged good are flagged for manual review despite matching reference images 310 existing in the product database 120. The example significance corrector 508 may adjust (e.g., increment or decrement) the significance values based on historical experience (e.g., based on the significance values of similar reference records). In some examples, the significance values may manually adjusted. In some examples, after adjusting significance values, the significance corrector 508 resets the reference image match score.

While an example manner of implementing the reference image generator 118 of FIG. 1 is illustrated in FIG. 5, one or more of the elements, processes and/or devices illustrated in FIG. 5 may be combined, divided, re-arranged, omitted, eliminated and/or implemented in any other way. Further, the example ROI definer 500, the feature point extractor 502, the example significance value assigner 508, the example significance corrector 508 and/or, more generally, the example reference image generator 118 of FIG. 1 may be implemented by hardware, software, firmware and/or any combination of hardware, software and/or firmware. Thus, for example, any of the example ROI definer 500, the feature point extractor 502, the example significance value assigner 508, the example significance corrector 508, and/or, more generally, the example reference image generator 118 of FIG. 1 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example ROI definer 500, the feature point extractor 502, the example significance value assigner 508, the example significance corrector 508, and/or, more generally, the example reference image generator 118 of FIG. 1 is/are hereby expressly defined to include a tangible computer readable storage device or storage disk such as a memory, a digital versatile disk (DVD), a compact disk (CD), a Blu-ray disk, etc. storing the software and/or firmware. Further still, the example reference image generator 118 of FIG. 1 may include one or more elements, processes and/or devices in addition to, or instead of, those illustrated in FIG. 4, and/or may include more than one of any or all of the illustrated elements, processes and devices.

Figure 6:
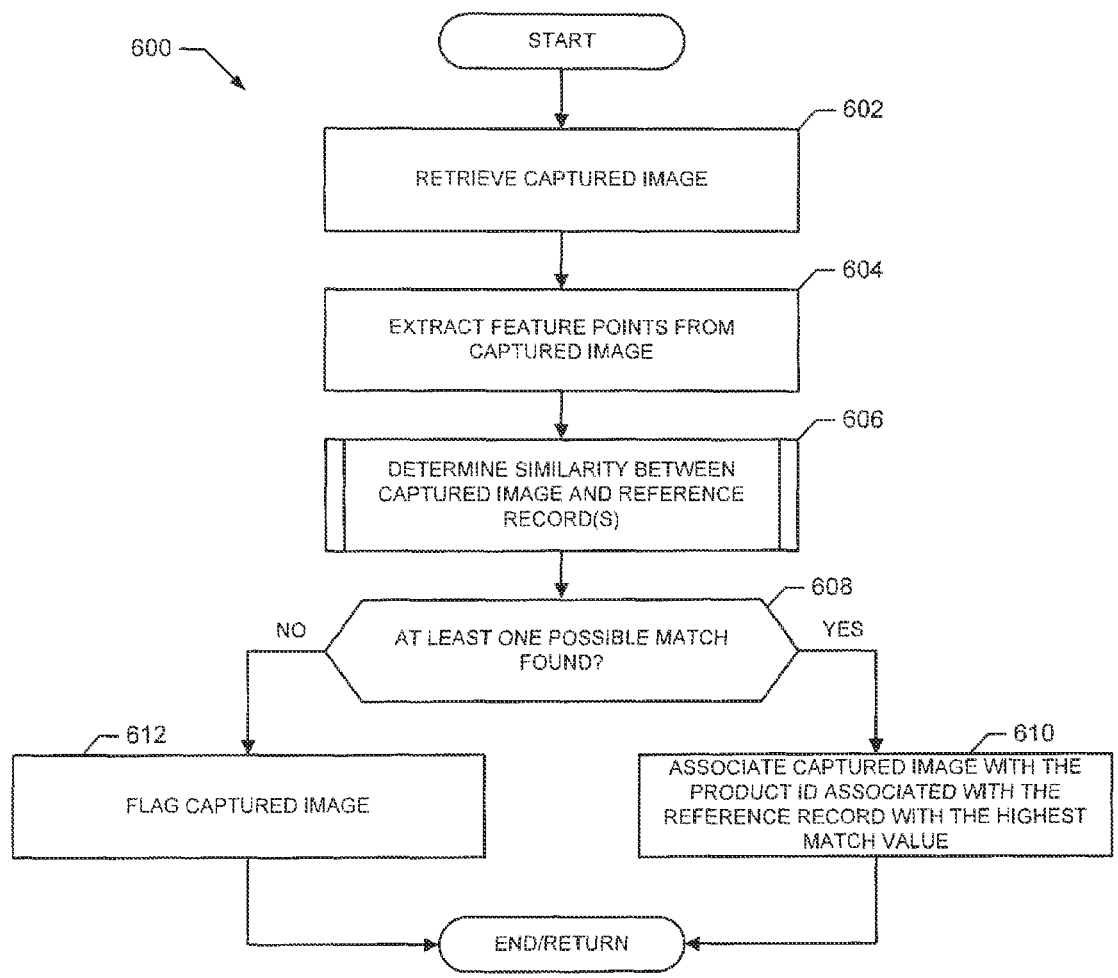
FIG. 6 is a flow diagram representative of example machine readable instructions that may be executed to implement the example image matcher of FIG. 3 to identify products in images.
Figure 7:
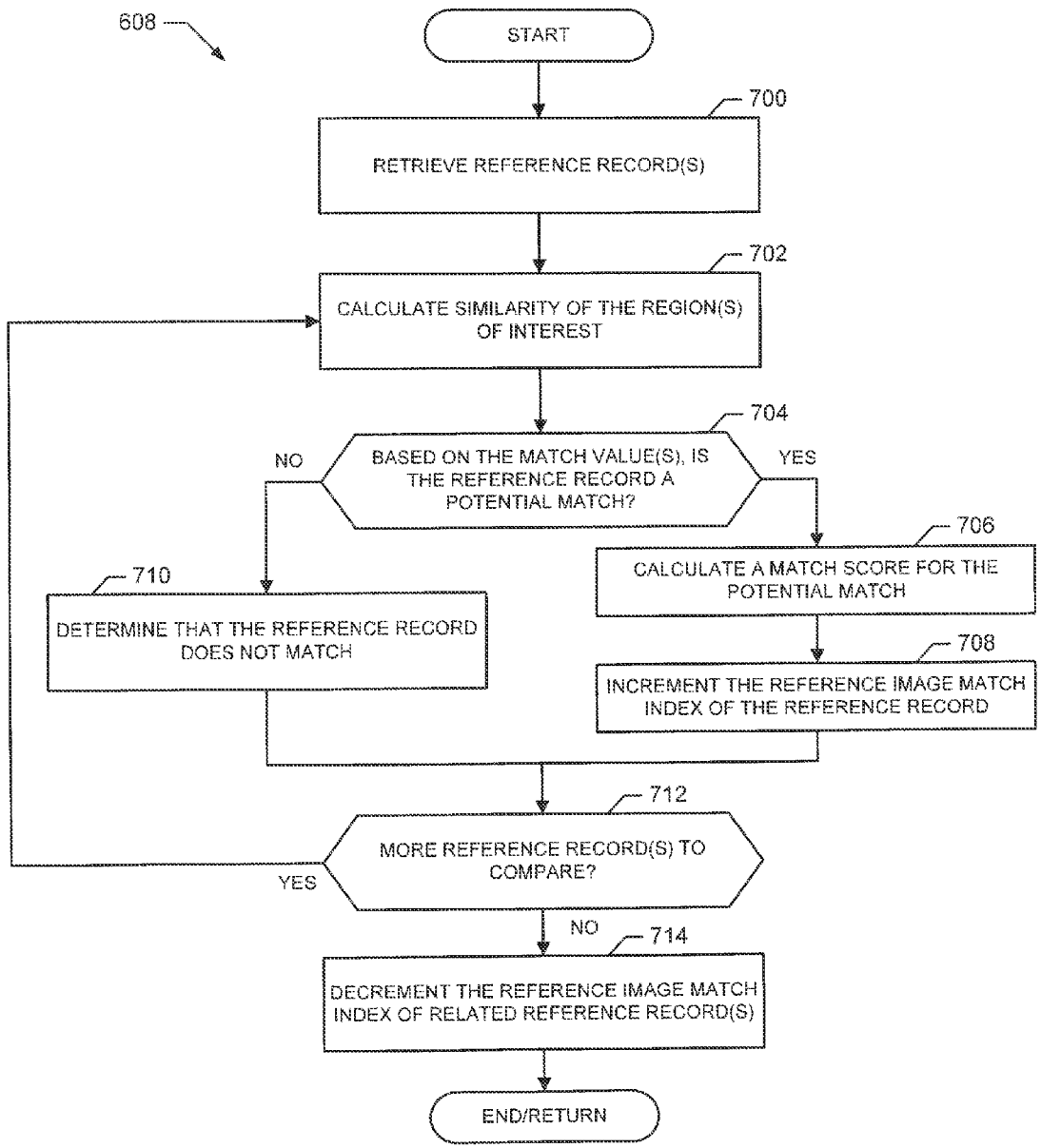
FIG. 7 is a flow diagram representative of example machine readable instructions that may be executed to implement the example candidate selector in the example image matcher of FIG. 3 to select, if present, potentially matching reference image records.

Flowcharts representative of example machine readable instructions for implementing the example image matcher 122 of FIG. 1 are shown in FIGS. 6, 7, and/or 9. In these examples, the machine readable instructions comprise program(s) for execution by a processor such as the processor 1012 shown in the example processor platform 1000 discussed below in connection with FIG. 10. The program may be embodied in software stored on a tangible computer readable storage medium such as a CD-ROM, a floppy disk, a hard drive, a digital versatile disk (DVD), a Blu-ray disk, or a memory associated with the processor 1012, but the entire program and/or parts thereof could alternatively be executed by a device other than the processor 1012 and/or embodied in firmware or dedicated hardware. Further, although the example program is described with reference to the flowcharts illustrated in FIGS. 6, 7, and/or 9, many other methods of implementing the example image matcher 122. For example, the order of execution of the blocks may be changed, and/or some of the blocks described may be changed, eliminated, or combined.

Figure 8:
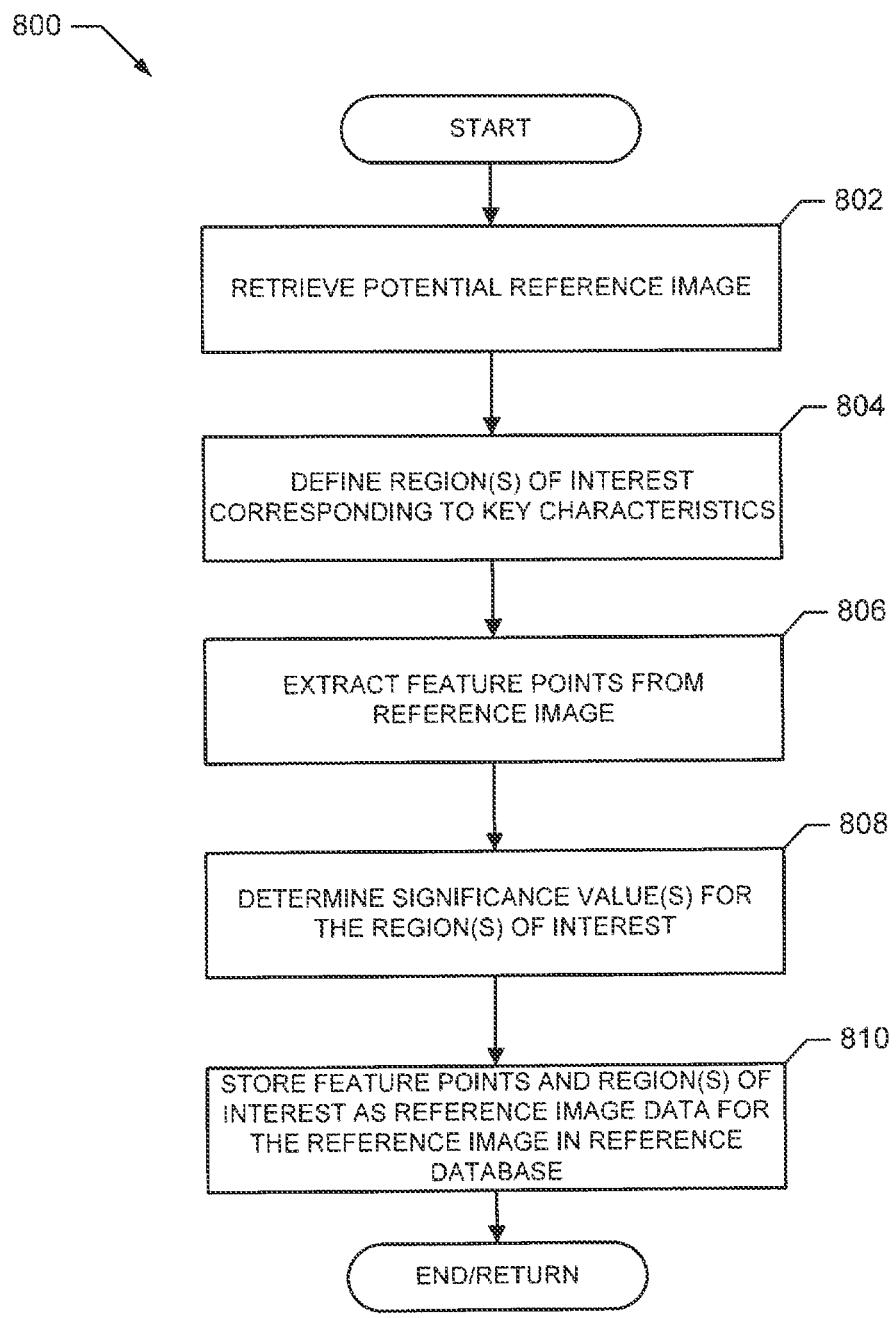
FIG. 8 is a flow diagram representative of example machine readable instructions that may be executed to implement the example reference image generator of FIG. 5 to generate reference image records with defined regions of interest.

A flowchart representative of example machine readable instructions for implementing the example reference image generator 118 of FIG. 1 is shown in FIG. 8. In these examples, the machine readable instructions comprise program(s) for execution by a processor such as the processor 1112 shown in the example processor platform 1100 discussed below in connection with FIG. 11. The program may be embodied in software stored on a tangible computer readable storage medium such as a CD-ROM, a floppy disk, a hard drive, a digital versatile disk (DVD), a Blu-ray disk, or a memory associated with the processor 1112, but the entire program and/or parts thereof could alternatively be executed by a device other than the processor 1112 and/or embodied in firmware or dedicated hardware. Further, although the example program is described with reference to the flowchart illustrated in FIG. 8, many other methods of implementing the example reference image generator 118 may alternatively be used. For example, the order of execution of the blocks may be changed, and/or some of the blocks described may be changed, eliminated, or combined.

As mentioned above, the example processes of FIGS. 6, 7, 8, and/or 9 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 6, 7, 8, and/or 9 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

FIG. 6 is a flow diagram representative of example machine readable instructions 600 that may be executed to implement the example image matcher 122 of FIGS. 1 and 3 to identify products in captured images 104. At block 602 of FIG. 6, the example feature point extractor 300 retrieves a captured (and possibly segmented) image 206 from the staging database 123. At block 604, the example feature point extractor 300 extracts feature points (e.g., the feature points 208 of FIGS. 2C and 2D) from the captured image 206 retrieved at block 602 and generates a captured image record 306. In some examples, the captured image record 306 includes the captured image 206 and the extracted feature points. At block 606, the example reference comparator 302 retrieves example reference image record(s) 310 from the example product database 120. In some examples, the reference comparator 302 uses a selection criterion to determine which reference records 310 to retrieve from the product database 120. The example reference comparator 302 determines the similarity between the retrieved reference records 310 and the captured image 206 by calculating match values for ROIs of the reference record 310.

At block 608, the reference comparator 302 determines whether at least one possible match was found at block 606. In some examples, a possible match is found if the significance values for the ROIs of a reference record 310 are satisfied by the corresponding match values determined at block 606. If at least one possible match was found, program control advances to block 610. Otherwise, if at least one possible match was not found, program control advances to block 612. At block 610, the reference comparator 302 generates a match record 312 with one of the possibly matching reference record(s) 310. In some examples, the reference comparator 302 calculates a match score for the possibly matching reference record(s) 310 and uses the reference record 310 with the highest match score to generate the match record 312. The example program 600 then ends. At block 612, the reference comparator 302 flags the captured image 206 for manual review as a potential new product. The example program 600 then ends.

FIG. 7 is a flow diagram representative of example machine readable instructions 608 that may be executed to implement the example reference comparator 302 of FIG. 3 to select, if present, reference image record(s) 310 to be possible matches to the captured image 206. At block 700 of FIG. 7, the example candidate selector 302 retrieves a reference image record 310 from the example product database 120. At block 702, the candidate selector 302 calculates the similarities between the ROIs and the captured image 206. In some examples, candidate selector 302 calculates the ROI match values for the ROIs of one of the reference records retrieved at block 700. At block 704, the reference comparator 302 determines whether the ROI match values calculated at block 702 satisfies (e.g., is greater than or equal to) the corresponding significance values included in the reference record 310. If the ROI match values satisfy the corresponding significance values, program control advances to block 706. Otherwise, the ROI match values do not satisfy the corresponding significance values, program control advances to block 710.

At block 706, the reference comparator 302 designates the reference image record 310 as a potential matching reference record 310 and calculates a match score for the potential matching reference record 310 using the ROI match values. At block 708, the reference comparator 302 increments the reference image match score 414 of the potential matching reference record 310. At block 712, the candidate selector 302 determines if there are more reference image records 310 to compare. If there are more reference image records 310 to compare, program control returns to block 702. Otherwise, if there are not more reference image records 310 to test, program control advances to block 714.

At block 714, the reference comparator 302 retrieves the reference records 310 from the product database 120 that correspond to the product IDs 402 of the potential matching reference record 310. The example potential matching reference record 310 then downwardly adjusts the reference image match score 414 of the retrieved reference records 310. For example, a product ID 402 may be associated with a first reference record, a second reference record, and a third reference record. In that example, if the first reference record was designated as a potential matching reference record 310 while the other reference records were not, the reference image match scores 414 of the second and third reference records would be decremented. Example program 608 then ends.

FIG. 8 is a flow diagram representative of example machine readable instructions 800 that may be executed to implement the example reference image generator 118 of FIGS. 1 and 4 which may be used to generate reference image records 310 with defined ROIs (e.g., the ROIs 202a-202F of FIGS. 2A and 2B). At block 802, the ROI definer 500 retrieves a potential reference image. In some examples, the potential reference image 502 and a product ID 402 is retrieved from an external source 119. Alternatively or additionally, the potential reference image 502 and the product ID 402 may be retrieved from the match database 124. At block 804, the region of interest definer 500 defines ROI(s) around key characteristic(s) 406 defined for the product ID 402. At block 804, the feature point extractor 400 extract reference image feature points 410 from the ROI(s) of the 502 potential reference image. At block 808, the significance value assigner 504 determines significance value(s) for the ROI(s) defined at block 806. In some examples, the significance value trainer 504 determines the significance value(s) through supervised machine learning techniques. At block 810, the significance value trainer 504 generates a reference image record 310 with the potential reference image 502, the reference image feature points 410, and the reference image ROIs 412. In some examples, the significance value trainer 504 sets the reference image match score 141 to zero. The example program 800 then ends.

Figure 9:
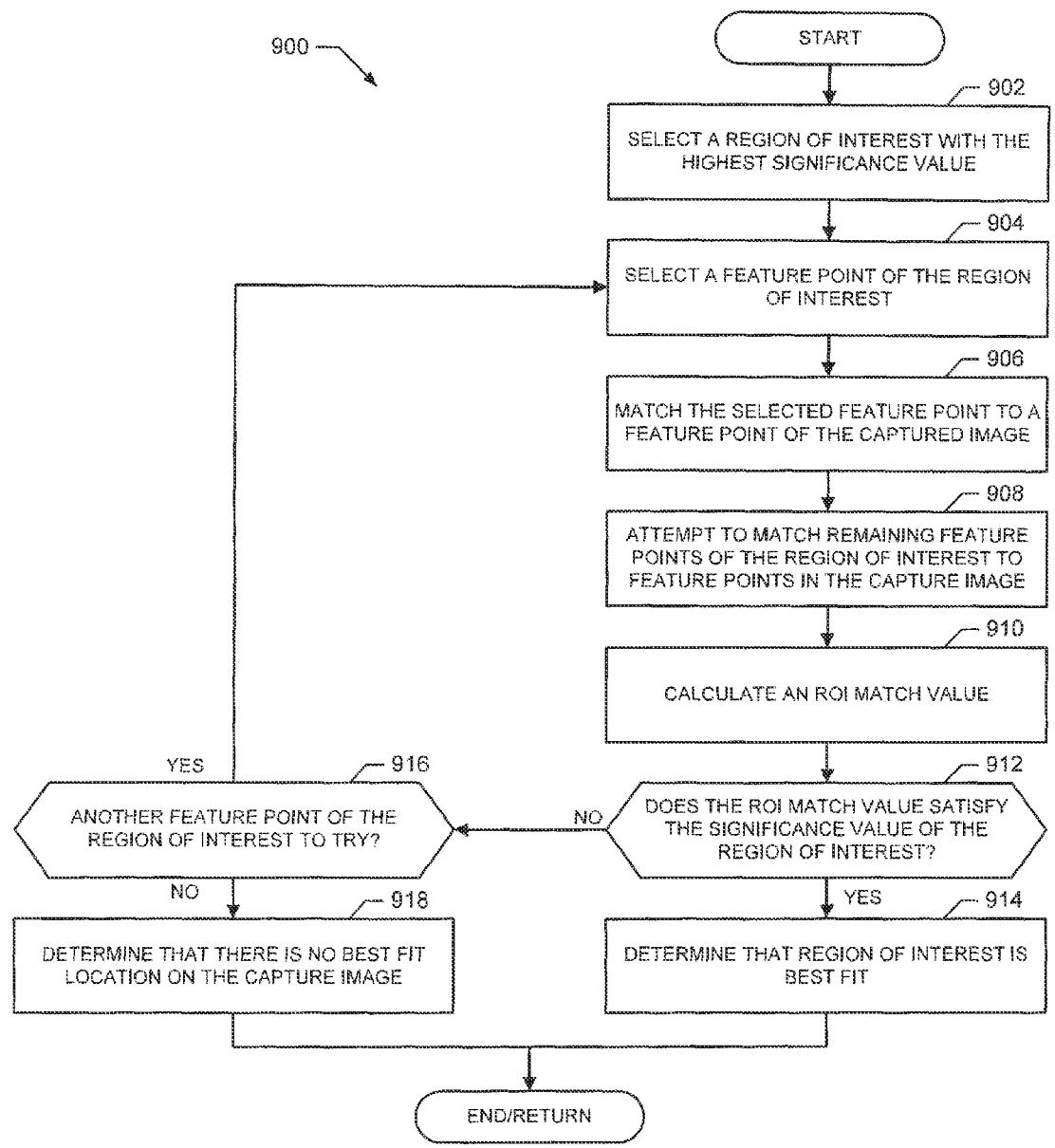
FIG. 9 is a flow diagram representative of example machine readable instructions that may be executed to implement the example candidate selector in the example image matcher of FIG. 3 to fit a region of interest of the reference image to the captured image.

FIG. 9 is a flow diagram representative of example machine readable instructions 900 that may be executed to implement the example reference comparator 302 of FIG. 3 to fit the most significant region of interest (e.g., the ROI with the highest significance value) of the reference image (e.g. the reference image 200a of FIG. 2A) to the captured image 206. Initially at block 902, the reference comparator 302 selects the ROI with the highest significance value stored in the reference record 310 associated with the reference image being matched. At block 904, the reference comparator 302 selects one of the feature points of the ROI selected at block 902. At block 906, the reference comparator 302 selects a matching feature point from the feature points of the captured image 206 for the reference image feature point (e.g., selects the nearest neighbor for the reference image feature point from the feature points of the captured image 206).

At block 908, the reference comparator 302 attempts to match the remaining feature points of the ROI with feature points in the captured image 206. In some examples, the reference comparator 302, using the matched feature point, overlays the boundaries of the ROI on the captured image 206. In such examples, when attempting to match the remaining feature points of the ROI, the reference comparator 302 ignores feature points of the captured image 206 that are not within the ROI. At block 910, the reference comparator 302 calculates an ROI match value for the ROI selected at block 902. In some examples, the ROI match value equals the percentage of feature points of the ROI that were matched to feature points of the capture image 206.

At block 912, the reference comparator 302 determines if the ROI match value calculated at block 910 satisfies (e.g., is greater than or equal to) the significance value of the ROI. If the ROI match value satisfies the significance value of the ROI, program control advances to block 914. Otherwise, if the ROI match value does not satisfy the significance value of the ROI, program control advances to block 916. At block 914, the reference comparator 302 determines that the ROI selected at block 902 is best fit to the captured image 206. The example program 900 then ends. At block 916, the reference comparator 302 determines if there is another feature point of the ROI selected at block 902. If there is another feature point of the ROI, program control returns to block 904. Otherwise, if there is not another feature point of the ROI, program control advances to block 918. At block 918, the reference comparator 302 determines that there is no best fit location on the captured image 206 for the selected ROI. The example program 900 then ends.

Figure 10:
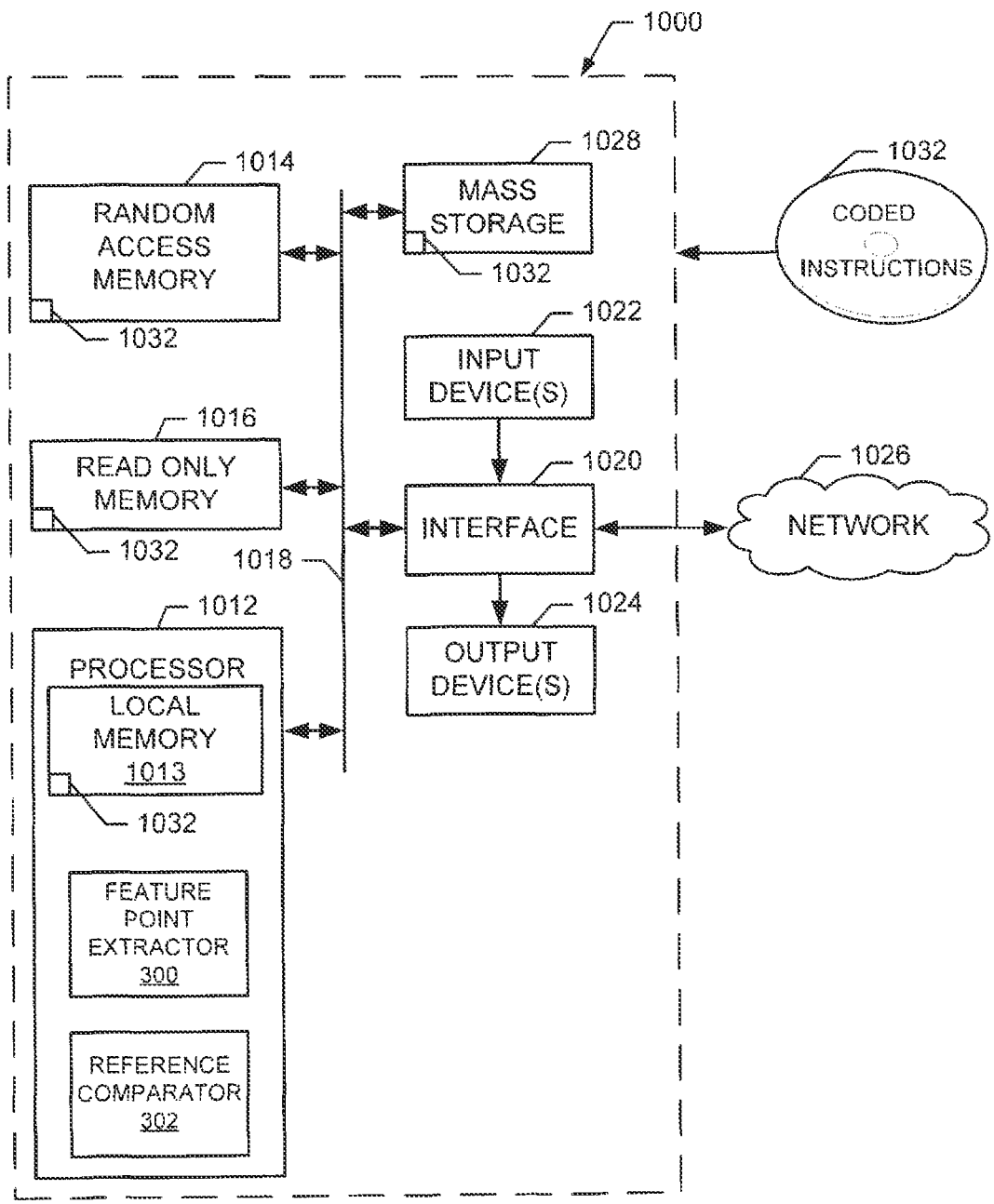
FIG. 10 is a block diagram of an example processor system structured to execute the example machine readable instructions represented by FIGS. 6, 7, and/or 9 to implement the example image matcher of FIG. 3.

FIG. 10 is a block diagram of an example processor platform 1000 structured to execute the instructions of FIGS. 6, 7, and/or 9 to implement the image matcher 118 of FIGS. 1 and 3. The processor platform 1000 can be, for example, a server, a personal computer, a workstation, or any other type of computing device.

The processor platform 1000 of the illustrated example includes a processor 1012. The processor 1012 of the illustrated example is hardware. For example, the processor 1012 can be implemented by one or more integrated circuits, logic circuits, microprocessors or controllers from any desired family or manufacturer.

The processor 1012 of the illustrated example includes a local memory 1013 (e.g., a cache). The example processor 1012 implements the example feature point extractor 300 and the example reference comparator 302 of FIG. 3. The processor 1012 of the illustrated example is in communication with a main memory including a volatile memory 1014 and a non-volatile memory 1016 via a bus 1018. The volatile memory 1014 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1016 may be implemented by flash memory and/or any other desired type of memory device. Access to the main memory 1014, 1016 is controlled by a memory controller.

The processor platform 1000 of the illustrated example also includes an interface circuit 1020. The interface circuit 1020 may be implemented by any type of interface standard, such as an Ethernet interface, a universal serial bus (USB), and/or a PCI express interface.

In the illustrated example, one or more input devices 1022 are connected to the interface circuit 1020. The input device(s) 1022 permit(s) a user to enter data and commands into the processor 1012. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1024 are also connected to the interface circuit 1020 of the illustrated example. The output devices 1024 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1020 of the illustrated example, thus, typically includes a graphics driver card, a graphics driver chip or a graphics driver processor.

The interface circuit 1020 of the illustrated example also includes a communication device such as a transmitter, a receiver, a transceiver, a modem and/or network interface card to facilitate exchange of data with external machines (e.g., computing devices of any kind) via a network 1026 (e.g., an Ethernet connection, a digital subscriber line (DSL), a telephone line, coaxial cable, a cellular telephone system, etc.).

The processor platform 1000 of the illustrated example also includes one or more mass storage devices 1028 for storing software and/or data. Examples of such mass storage devices 1028 include floppy disk drives, hard drive disks, compact disk drives, Blu-ray disk drives, RAID systems, and digital versatile disk (DVD) drives.

The coded instructions 1032 of FIGS. 6, 7, and/or 9 may be stored in the mass storage device 1028, in the volatile memory 1014, in the non-volatile memory 916, and/or on a removable tangible computer readable storage medium such as a CD or DVD.

Figure 11:
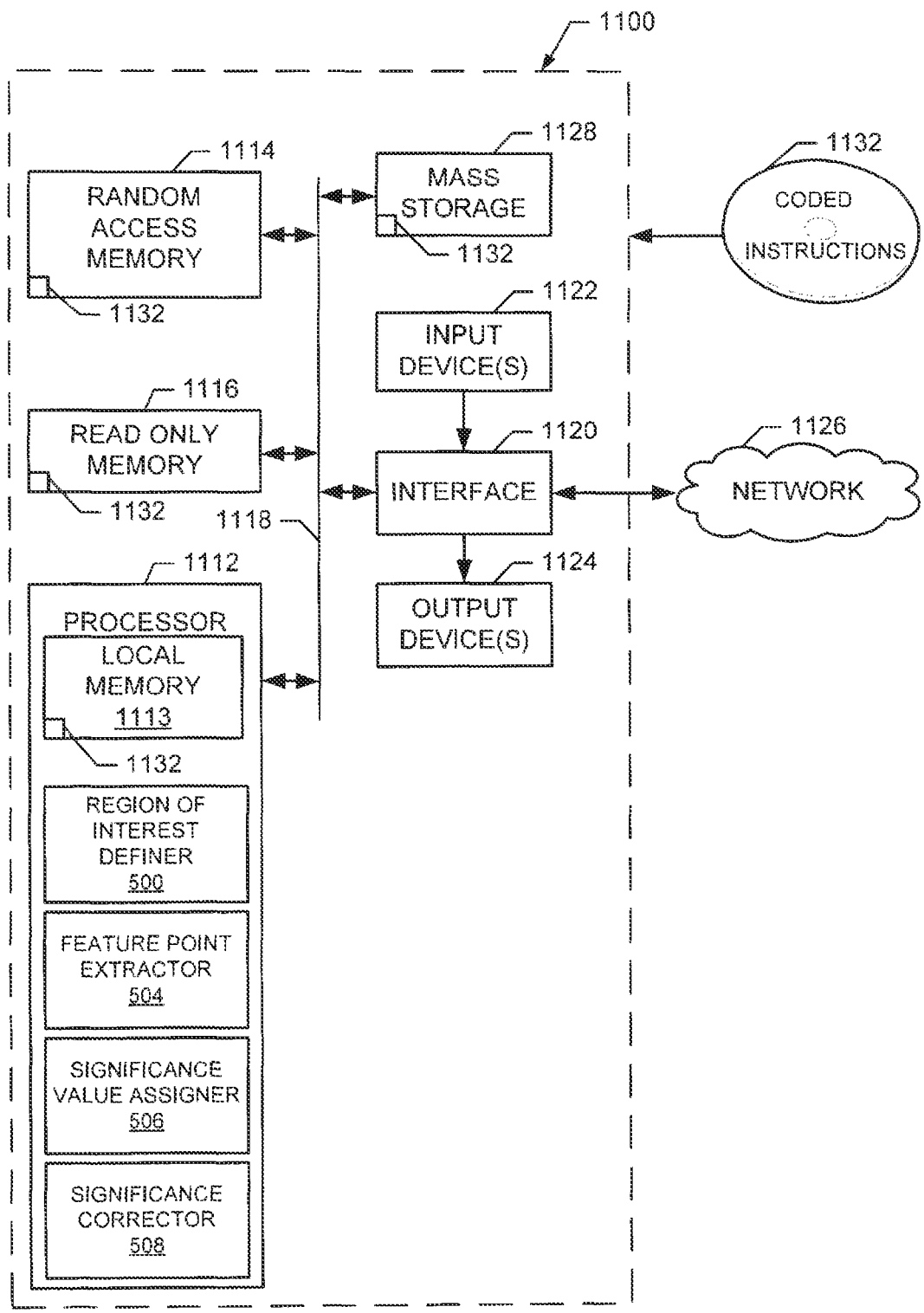
FIG. 11 is a block diagram of an example processor system structured to execute the example machine readable instructions represented by FIG. 8 to implement the example reference image generator of FIG. 5.

FIG. 11 is a block diagram of an example processor platform 1100 structured to execute the instructions of FIG. 8 to implement reference image generator 118 of FIGS. 1 and 4. The processor platform 1100 can be, for example, a server, a personal computer, a workstation, or any other type of computing device.

The processor platform 1100 of the illustrated example includes a processor 1112. The processor 1112 of the illustrated example is hardware. For example, the processor 1112 can be implemented by one or more integrated circuits, logic circuits, microprocessors or controllers from any desired family or manufacturer.

The processor 1112 of the illustrated example includes a local memory 1113 (e.g., a cache). The example processor 1112 implements the example region of interest definer 500, the example feature point extractor 504, the example significance value assigner 506, and the example significance corrector 508 of FIG. 5. The processor 1112 of the illustrated example is in communication with a main memory including a volatile memory 1114 and a non-volatile memory 1116 via a bus 1118. The volatile memory 1114 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1116 may be implemented by flash memory and/or any other desired type of memory device. Access to the main memory 1114, 1116 is controlled by a memory controller.

The processor platform 1100 of the illustrated example also includes an interface circuit 1120. The interface circuit 1120 may be implemented by any type of interface standard, such as an Ethernet interface, a universal serial bus (USB), and/or a PCI express interface.

In the illustrated example, one or more input devices 1122 are connected to the interface circuit 1120. The input device(s) 1122 permit(s) a user to enter data and commands into the processor 1112. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1124 are also connected to the interface circuit 1120 of the illustrated example. The output devices 1124 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1120 of the illustrated example, thus, typically includes a graphics driver card, a graphics driver chip or a graphics driver processor.

The interface circuit 1120 of the illustrated example also includes a communication device such as a transmitter, a receiver, a transceiver, a modem and/or network interface card to facilitate exchange of data with external machines (e.g., computing devices of any kind) via a network 1126 (e.g., an Ethernet connection, a digital subscriber line (DSL), a telephone line, coaxial cable, a cellular telephone system, etc.).

The processor platform 1100 of the illustrated example also includes one or more mass storage devices 1128 for storing software and/or data. Examples of such mass storage devices 1128 include floppy disk drives, hard drive disks, compact disk drives, Blu-ray disk drives, RAID systems, and digital versatile disk (DVD) drives.

The coded instructions 1032 of FIG. 8 may be stored in the mass storage device 1128, in the volatile memory 1114, in the non-volatile memory 1116, and/or on a removable tangible computer readable storage medium such as a CD or DVD.

From the foregoing, it will be appreciated that examples have been disclosed which allow identification, through context-based image recognition, of consumer product goods that share similar branding and/or package design. In addition, it will be appreciated that examples have been disclosed that, through context-based image recognition, reduce the processing required (e.g., processor cycles, etc.) to identify a consumer product good from goods that share similar branding and/or package design. In addition, it will be appreciated that examples have been disclosed that, through context-based image recognition, reduce a number of false positive matches, thus reducing processing required to reprocess the false positive matches.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method to determine whether a first image depicts a product, the method comprising:
   receiving the first image, the first image captured by a mobile device;
   comparing, by executing an instruction with a processor, a first subset of feature points in a first region of interest of a reference image with a first subset of feature points of the first image residing within a first region corresponding spatially to the first region of interest and located at a first location in the first image to determine a first match value;
   in response to determining the first match value satisfies a first threshold, comparing, by executing an instruction with the processor, a second subset of feature points in a second region of interest of the reference image with a second subset of the feature points of the first image residing within a second region of the first image corresponding spatially to the second region of interest to determine a second match value; and
   in response to determining the second match value satisfies a second threshold lower than the first threshold, associating, by executing an instruction with the processor, the first image with product information associated with the reference image.

2. The method as defined in claim 1, wherein the second region of the first image is located at a second location in the first image, the second location being selected relative to the first location based on a spatial relationship between the first region of interest and the second region of interest in the reference image.

3. The method as defined in claim 2, further including, in response to determining the first match value does not satisfy the first threshold:
   selecting a third subset of feature points of the first image within a third region of the first image corresponding spatially to the first region of interest and located at a third location in the first image to determine a third match value; and
   in response to determining the third match value satisfies the first threshold, comparing, with the processor, the second subset of feature points in the second region of interest of the reference image with a fourth subset of feature points of the first image residing within a fourth region corresponding spatially to the second region of interest and located at a fourth location in the first image to determine a fourth match value, the fourth location being selected relative to the third location based on the spatial relationship between the first region of interest and the second region of interest in the reference image.

4. The method as defined in claim 1, wherein the comparing of the first subset of feature points in the first region of interest of the reference image with the first subset of feature points of the first image includes:
   calculating distances between the first subset of feature points in the first region of interest of the reference image and the first subset of feature points of the first image to determine a percentage of the first subset of feature points in the first region of interest of the reference image that match corresponding feature points from the first subset of feature points of the first image; and
   calculating the first match value based on the percentage.

5. The method as defined in claim 1, wherein the reference image is associated with a plurality of regions of interest having respective assigned significance values, and further including:
   selecting the first region of interest having a highest significance value out of the plurality of regions of interest associated with the reference image; and setting the first threshold to correspond to a first significance value associated with the first region of interest.

6. The method as defined in claim 1, wherein the reference image is a first reference image associated with the product, the product is associated with a plurality of different reference images, and further including:
in response to determining the second match value satisfies the second threshold:
incrementing a first index value associated with the first reference image;
decrementing index values associated with respective ones of the plurality of reference images other than the first reference image; and
discarding ones of the plurality of reference images associated with index values that do not satisfy a third threshold.

7. The method as defined in claim 1, further including improving accuracy of an image matcher by utilizing different first and second thresholds adjusted to a number of false positive matches between the reference images and captured images depicting products to be identified.

8. The method as defined in claim 1, further including:
in response to determining the second match value satisfies the second threshold, sending the product information associated with the reference image to the mobile device.

9. An apparatus to determine whether a first digital image depicts a product, the apparatus comprising:
a feature point extractor to determine feature points in the first digital image; and
a reference comparator to:
compare a first subset of feature points in a first region of interest of a digital reference image with a first subset of the feature points of the first digital image residing within a first region corresponding spatially to the first region of interest and located at a first location in the first digital image to determine a first match value;
in response to determining the first match value satisfies a first threshold, compare a second subset of feature points in a second region of interest of the digital reference image with a second subset of the feature points of the first digital image residing within a second region of the first digital image corresponding spatially to the second region of interest to determine a second match value; and
in response to determining the second match value satisfies a second threshold lower than the first threshold, associate the first digital image with product information associated with the digital reference image, at least one of the feature point extractor or the reference comparator including hardware.

10. The apparatus as defined in claim 9, wherein the second region of the first digital image is located at a second location in the first image, the second location being selected relative to the first location based on a spatial relationship between the first region of interest and the second region of interest in the reference image.

11. The apparatus as defined in claim 9, wherein to compare the first subset of feature points in the first region of interest of the reference image with the first subset of feature points of the first image, the reference comparator is further to:
calculate distances between the first subset of feature points in the first region of interest of the reference image and the first subset of feature points of the first digital image to determine a percentage of the first subset of feature points in the first region of interest of the reference image that match corresponding feature points from the first subset of feature points of the first image; and
calculate the first match value based on the percentage.

12. The apparatus as defined in claim 9, wherein the reference image is associated with a plurality of regions of interest having respective assigned significance values, and the reference comparator is further to:
select the first region of interest having a highest significance value out of a plurality of regions of interest associated with the reference image; and
set the first threshold to correspond to a first significance value associated with the first region of interest.

13. The apparatus as defined in claim 9, wherein the reference image is a first reference image associated with the product, the product is associated with a plurality of different reference images, and further including:
a reference image manager to, in response to determining the second match value satisfies the second threshold:
increment a first index value associated with the first reference image;
decrement index values associated with respective ones of the plurality of reference images other than the first reference image; and
discard ones of the plurality of reference images associated with index values that do not satisfy a third threshold.

14. The apparatus as defined in claim 9, wherein, in response to determining the first match value does not satisfy the first threshold, the reference comparator is further to:
select a third subset of the feature points of the first digital image within a third region of the first digital image corresponding spatially to the first region of interest and located at a third location in the first digital image to determine a third match value;
in response to determining the third match value satisfies the first threshold, compare the second subset of feature points in the second region of interest of the reference image with a fourth subset of the feature points of the first digital image residing within a fourth region corresponding spatially to the second region of interest and located at a fourth location in the first digital image to determine a fourth match value, the fourth location being selected relative to the third location based on the spatial relationship between the first region of interest and the second region of interest in the reference image.

15. The apparatus as defined in claim 9, wherein the reference comparator is to improve accuracy of an image matcher by utilizing different first and second thresholds adjusted to a number of false positive matches between the reference image and captured images depicting products to be identified.

16. A tangible computer readable storage medium comprising instructions which, when executed, cause a machine to at least:
receive a first image, the first image captured by a mobile device;
compare a first subset of feature points in a first region of interest of a reference image with a first subset of the feature points of the first image residing within a first region corresponding spatially to the first region of interest and located at a first location in the first image to determine a first match value;
in response to determining the first match value satisfies a first threshold, compare a second subset of feature points in a second region of interest of the reference image with a second subset of the feature points of the first image residing within a second region of the first image corresponding spatially to the second region of interest to determine a second match value; and in response to determining the second match value satisfies a second threshold lower than the first threshold, associate the first image with product information associated with the reference image.

17. The tangible computer readable medium as defined in claim 16, wherein the second region of the first image is located at a second location in the first image, the second location being selected relative to the first location based on a spatial relationship between the first region of interest and the second region of interest in the reference image.

18. The tangible computer readable medium as defined in claim 16, wherein to compare the first subset of feature points in the first region of interest of the reference image with the first subset of feature points of the first image, the instructions, when executed, further cause the machine to:

calculate distances between the first subset of feature points in the first region of interest of the reference image and the first subset of feature points of the first image to determine a percentage of the first subset of feature points in the first region of interest of the reference image that match corresponding feature points from the first subset of feature points of the first image; and calculate the first match value based on the percentage.

19. The tangible computer readable medium as defined in claim 16, wherein the reference image is associated with a plurality of regions of interest having respective assigned significance values, and the instructions, when executed, further cause the machine to:

select the first region of interest having a highest significance value out of a plurality of regions of interest associated with the reference image; and set the first threshold to correspond to a first significance value associated with the first region of interest.

20. The tangible computer readable medium as defined in claim 16, wherein the reference image is a first reference image associated with the product, the product is associated with a plurality of different reference images, and the instructions, when executed, further cause the machine to:

increment a first index value associated with the first reference image;

decrement index values associated with respective ones of the plurality of reference images other than the first reference image; and discard ones of the plurality of reference images associated with index values that do not satisfy a third threshold.

21. The tangible computer readable medium as defined in claim 16, wherein, in response to determining the first match value does not satisfy the first threshold, the instructions, when executed, further cause the machine to:

select a third subset of the feature points of the first image within a third region of the first image corresponding spatially to the first region of interest and located at a third location in the first image to determine a third match value;

in response to determining the third match value satisfies the first threshold, compare the second subset of feature points in the second region of interest of the reference image with a fourth subset of the feature points of the first image residing within a fourth region corresponding spatially to the second region of interest and located at a fourth location in the first image to determine a fourth match value, the fourth location being selected relative to the third location based on the spatial relationship between the first region of interest and the second region of interest in the reference image.

22. The tangible computer readable medium as defined in claim 16, wherein the first region of interest does not overlap the second region of interest.

23. The tangible computer readable storage medium as defined in claim 16, wherein the instructions, when executed, cause the machine further to improve accuracy of an image matcher by utilizing different first and second thresholds adjusted to a number of false positive matches between the reference images and captured image depicting products to be identified.

24. The tangible computer readable medium as defined in claim 16, wherein the instructions, when executed, cause the machine further to:

in response to determining the second match value satisfies the second threshold, sending the product information associated with the reference image to the mobile device.

\* \* \* \* \*